(12) United States Patent
Leuenberger et al.

(10) Patent No.: US 12,044,950 B2
(45) Date of Patent: Jul. 23, 2024

(54) IR SOURCE AND PHASED ANTENNA WITH GRAPHENE LAYER AND RELATED METHODS

(71) Applicant: UNIVERSITY OF CENTRAL FLORIDA RESEARCH FOUNDATION, INC., Orlando, FL (US)

(72) Inventors: Michael N. Leuenberger, Orlando, FL (US); Muhammad Waqas Shabbir, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 18/531,939

(22) Filed: Dec. 7, 2023

(65) Prior Publication Data

US 2024/0142851 A1     May 2, 2024

Related U.S. Application Data

(62) Division of application No. 17/444,087, filed on Jul. 30, 2021, now Pat. No. 11,899,335.

(60) Provisional application No. 63/059,456, filed on Jul. 31, 2020.

(51) Int. Cl.
*G02F 1/29* (2006.01)

(52) U.S. Cl.
CPC ................... *G02F 1/292* (2013.01)

(58) Field of Classification Search
CPC ...................................... G02F 1/292
See application file for complete search history.

(56) References Cited

U.S. PATENT DOCUMENTS

| | | | |
|---|---|---|---|
| 9,356,178 B2 | 5/2016 | Peale et al. | |
| 10,312,389 B2 | 6/2019 | Chanda et al. | |
| 10,784,387 B2 | 9/2020 | Chanda et al. | |
| 2011/0052813 A1* | 3/2011 | Ho | B82Y 30/00 427/256 |
| 2013/0193404 A1* | 8/2013 | Koppens | H01L 31/0475 977/734 |
| 2017/0372667 A1* | 12/2017 | Wei | H01L 25/13 |

OTHER PUBLICATIONS

Christoloveanu et al. "The concept of electrostatic doping and related devices" vol. 155, May 2019, https://www.sciencedirect.com/science/article/pil/S0038110118306385; pp. 32-43. *** See U.S. Appl. No. 17/444,087.

* cited by examiner

*Primary Examiner* — Jessica M Merlin
(74) *Attorney, Agent, or Firm* — Allen, Dyer, Doppelt + Gilchrist, PA

(57) ABSTRACT

A method is for operating a phased array. The method includes operating circuity coupled between first and second electrically conductive contacts to apply a voltage signal between the first and second electrically conductive contacts, change the voltage signal to selectively set phase change between IR radiation emitted from adjacent elliptical holes to emit the IR radiation at an angle from normal, and change the voltage signal to selectively set a frequency range of the IR radiation.

20 Claims, 27 Drawing Sheets

IR SOURCE AND PHASED ANTENNA WITH GRAPHENE LAYER AND RELATED METHODS

RELATED APPLICATION

This application is a divisional of application Ser. No. 17/444,087 filed Jul. 30, 2021, which is based upon Application No. 63/059,456 filed Jul. 31, 2020, the entire subject matter of these applications is incorporated herein by reference in its entirety.

GOVERNMENT RIGHTS

This invention was made with government support under contract number NSF-CISE-1514089 awarded by National Science Foundation. The government has certain rights in the invention.

TECHNICAL FIELD

The present disclosure relates to the field of radiation sources, and, more particularly, to an infrared source and related methods.

BACKGROUND

Infrared (IR) sources are useful in many applications. For example, IR sources can be used in spectroscopy applications, and used to irradiate an unknown object. In some applications, IR sources are used for communications in electro-optic platforms. In some recent advances, near-IR (NIR) spectroscopy has been used to detect viral matter.

In some approaches, graphene has been used in IR applications. Graphene, one of the widely studied two dimensional materials, comprises a single layer of carbon atoms in a honeycomb lattice. It has special electrical, optical, and mechanical properties due to its tunable band dispersion relation and atomic thickness. Because of its unique band structure, graphene possesses very high mobility and fast carrier relaxation time, making it an attractive candidate for ultrafast electronics and optoelectronic devices such as transistors, optical switches, mid-infrared (MIR) photodetectors, photovoltaic devices, saturated absorbers and ultrafast lasers, etc.

For example, U.S. Pat. Nos. 10,784,387 and 10,312,389 are assigned to the present application's assignee and each discloses an optical detector device including a substrate, and a reflector layer carried by the substrate. The optical detector device comprises a first dielectric layer over the reflector layer, and a graphene layer over the first dielectric layer and having a perforated pattern therein.

SUMMARY

Generally, an IR source may include an electrically conductive layer, a first dielectric layer over the electrically conductive layer, a transparent electrically conductive layer over the first dielectric layer, a second dielectric layer over the transparent electrically conductive layer, and a graphene layer over the second dielectric layer and having a perforated pattern. The IR source may further comprise first and second electrically conductive contacts coupled to the graphene layer. The graphene layer may be configured to emit IR radiation in a frequency range when a voltage signal is applied between the first and second electrically conductive contacts.

More specifically, the graphene layer may be configured to emit the IR radiation at an angle from normal based upon the voltage signal. The graphene layer may be configured to emit the IR radiation at the angle within a range of 12°-80° from normal based upon the voltage signal. The graphene layer may be configured to selectively change the frequency range based upon the voltage signal.

In some embodiments, the perforated pattern may comprise an array of elliptical holes. The graphene layer may be configured to emit mid-IR radiation. For example, the electrically conductive layer may comprise at least one of gold, silver, and platinum, and the first dielectric layer may comprise a polymer layer, and wherein the second dielectric layer comprises an oxide layer. The electrically conductive layer may be coupled to a reference voltage, for example, a ground potential.

Another aspect is directed to a phased array. The phased array may include an electrically conductive layer, a first dielectric layer over the electrically conductive layer, and a transparent electrically conductive layer over the first dielectric layer. The phased array may also comprise a second dielectric layer over the transparent electrically conductive layer, and a graphene layer over the second dielectric layer and having a perforated pattern comprising an array of elliptical holes. The graphene layer may be configured to emit IR radiation in a frequency range. The phased array also may comprise first and second electrically conductive contacts coupled to the graphene layer, and circuity. The circuity may be configured to apply a voltage signal between the first and second electrically conductive contacts, change the voltage signal to selectively set phase change between the IR radiation emitted from adjacent elliptical holes to emit the IR radiation at an angle from normal, and change the voltage signal to selectively set the frequency range of the IR radiation.

Another aspect is directed to a method for making an IR source. The method may comprise forming a first dielectric layer over an electrically conductive layer, forming a transparent electrically conductive layer over the first dielectric layer, and forming a second dielectric layer over the transparent electrically conductive layer. The method may further include forming a graphene layer over the second dielectric layer and having a perforated pattern, and forming first and second electrically conductive contacts coupled to the graphene layer. The graphene layer may be configured to emit IR radiation in a frequency range when a voltage signal is applied between the first and second electrically conductive contacts.

Yet another aspect is directed to a method of operating a phased array comprising an electrically conductive layer, a first dielectric layer over the electrically conductive layer, a transparent electrically conductive layer over the first dielectric layer, a second dielectric layer over the transparent electrically conductive layer, a graphene layer over the second dielectric layer and having a perforated pattern comprising an array of elliptical holes, the graphene layer configured to emit IR radiation in a frequency range, and first and second electrically conductive contacts coupled to the graphene layer. The method may include operating circuity coupled between the first and second electrically conductive contacts to apply a voltage signal between the first and second electrically conductive contacts, change the voltage signal to selectively set phase change between the IR radiation emitted from adjacent elliptical holes to emit the IR radiation at an angle from normal, and change the voltage signal to selectively set the frequency range of the IR radiation.

DETAILED DESCRIPTION

Figure 1:
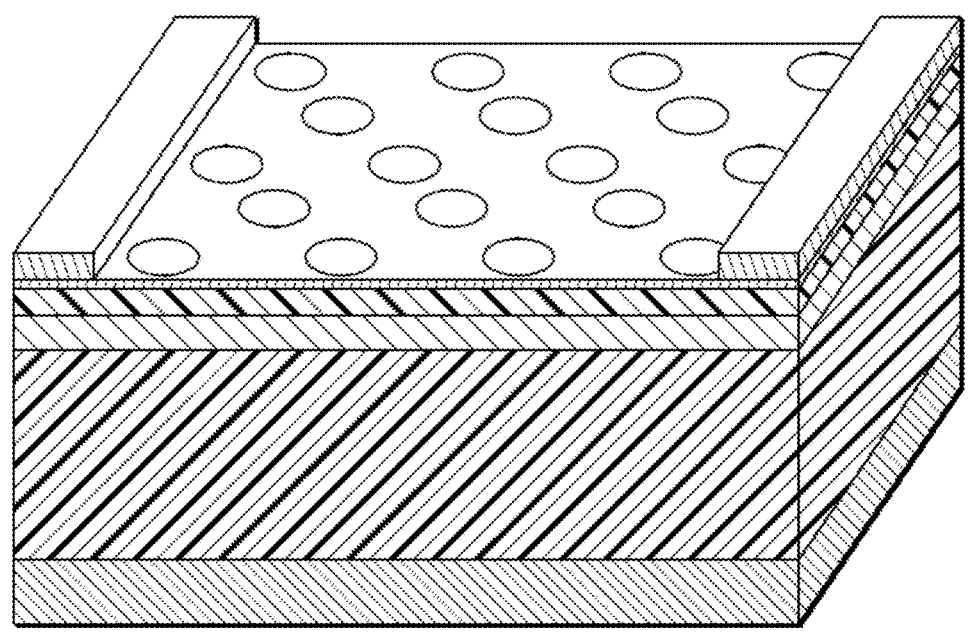
FIG. 1 is an image of an ultrafast mid-IR light source based on patterned graphene placed on top of a cavity, which can be tuned by means of a gate voltage applied to the indium tin oxide layer, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

An object that is kept in equilibrium at a given temperature T>0 K emits electromagnetic (EM) radiation because the charge carriers on the atomic and molecular scale oscillate due to their heat energy. [3] Planck's law describes quantitatively the energy density $u(\omega)$ of the EM radiation per unit frequency $\omega$ for black-body radiation, which is $$u_{BB}(\omega)d\omega = \frac{\omega^2}{\pi^2 c^3}\Theta(\omega)d\omega,$$

where c is the speed of light in vacuum, $\hbar$ is the Planck constant, and $k_B$ is the Boltzmann constant. $\Theta(\omega,T)=\hbar\omega/[\exp(\hbar\omega/k_B T)-1]$ is the thermal energy of a photon mode. Consequently, the energy emitted per unit surface area and per unit frequency, also called spectral radiance, of a black body into three-dimensional (3D) space is given by $$I_{BB}(\omega)d\omega = \frac{1}{4\pi}cu(\omega) = \frac{\omega^2}{4\pi^3 c^2}\Theta(\omega)d\omega. \quad (1)$$

The total energy density u can then be obtained by integrating over all frequencies and angles over the half-sphere, leading to the Stefan-Boltzmann law for the energy density of black-body radiation, $$u_{BB} = \left(\frac{8\pi^5 k_B^4}{15 c^3 h^3}\right)T^4 = a_{BB}T^4, \quad (2)$$

with $a_{BB}=7.566\times10^{-16}$ Jm$^{-3}$ K$^{-4}$. The total power emitted per unit surface area P/A of a black-body is $$\begin{aligned}I_{BB} = \frac{P}{A} &= \int_0^\infty I_{BB}(\omega)d\omega \int_0^{2\pi} d\varphi \int_0^{\pi/2} \cos\theta\sin\theta d\theta \\ &= \pi \int_0^\infty I_{BB}(\omega)d\omega = \frac{1}{4\pi}uc \\ &= \frac{a_{BB}c}{4\pi}T^4 = b_{BB}T^4 = \left(\frac{\pi^2 k_B^4}{60 c^2 h^3}\right)T^4\end{aligned} \quad (3)$$

where $b_{BB}=5.67\times10^{-8}$ Wm$^{-2}$K$^{-4}$ is the Stefan-Boltzmann constant. The factor cos θ is due to the fact that black bodies are Lambertian radiators.

In recent years, several methods have been implemented for achieving a spectrally selective emittance, in particular narrowband emittance, which increases the coherence of the emitted photons. One possibility is to use a material that exhibits optical resonances due to the band structure or due to confinement of the charge carriers.[3] Another method is to use structural optical resonances to enhance and/or suppress the emittance. Recently, photonic crystal structures have been used to implement passive pass band filters that reflect the thermal emission at wavelengths that match the photonic bandgap.[8, 17] Alternatively, a truncated photonic crystal can be used to enhance the emittance at resonant frequencies.[6, 28]

Recent experiments have shown that it is possible to generate infrared (IR) emission by means of Joule heating created by means of a bias voltage applied to graphene on a $SiO_2$/Si substrate. [9, 20] In order to avoid the breakdown of the graphene sheet at around T=700 K, the graphene sheet can be encapsulated between hexagonal boron nitride (h-BN) layers, which remove efficiently the heat from graphene. The top layer protects it from oxidation.[14, 19] In this way, the graphene sheet can be heated up to T=1600 K,[19] or even above T=2000 K.[14, 26] Kim et al. and Luo et al. demonstrated broadband visible emission peaked around a wavelength of $\lambda$=725 nm.[14, 19] By using a photonic crystal substrate made of Si, Shiue et al. demonstrated narrowband near-IR emission peaked at around $\lambda$=1600 nm with an emittance of around $\epsilon$=0.07. To the best of our knowledge, there are neither theoretical nor experimental studies on spectrally selective thermal emission from graphene in the mid-IR range.

Here, we present the proof of concept of a method to tune the spectrally selective thermal emission from nanopatterned graphene (NPG) by means of a gate voltage that varies the resonance wavelength of localized surface plasmons (LSPs) around the circular holes that are arranged in a hexagonal or square lattice pattern in a single graphene sheet in the wavelength regime between 3 µm and 12 µm. By generalizing Planck's radiation theory to grey-body emission, we show that the thermal emission spectrum can be tuned in or out of the two main atmospheric transparency windows of 3 to 5 µm and 8 to 12 µm in the mid-IR regime, and also in or out of the opaque mid-IR regime between 5 and 8 µm. In addition, the gate voltage can be used to tune the direction of the thermal emission due to the coherence between the localized surface plasmons (LSPs) around the holes due to the nonlocal response function in graphene, which we show by means of a nonlocal fluctuation-dissipation theorem. The main element of the nanostructure is a circular hole of diameter a in a graphene sheet. Therefore let us focus first on the optoelectronic properties of a single hole. The frequency-dependent dipole moment of the hole is $$p(r, \omega) = -\varepsilon_0 \varepsilon(r, \omega) E_{0\|} \qquad (4)$$
$$= -\alpha_{1,2}(r, \omega) E_{0\|},$$

where the polarizabilities $\alpha_{1,2}$ are given along the main axes x and y of the elliptic hole, and $r=r_0$ is the position of the dipole moment, i.e. the hole. Graphene's dielectric function is isotropic in the xy-plane, i.e. $\epsilon''_{\|}=\epsilon''_{xx}=\epsilon''_{yy}$. $V_0$ is the volume of the graphene sheet. In the Supplementary Information we derive the general polarizabilities of an uncharged single-sheet hyperboloid with dielectric function $\epsilon(\omega)$ inside a medium with dielectric constant $\epsilon_m$ [see Eq. (163)]. The polarizabilities of an elliptical wormhole in x- and y-direction read $$\alpha_1(\omega) = \frac{2abd\pi(\pi/2-1)}{3} \frac{\varepsilon(\omega)-\varepsilon_m}{\varepsilon_m + L_1[\varepsilon(\omega)-\varepsilon_m]}, \qquad (5)$$

$$\alpha_2(\omega) = \frac{2abd\pi(\pi/2-1)}{3} \frac{\varepsilon(\omega)-\varepsilon_m}{\varepsilon_m + L_2[\varepsilon(\omega)-\varepsilon_m]}. \qquad (6)$$

respectively, for which the in-plane polarizabilities lies in the plane of the graphene sheet that is parallel to the xy-plane. $\epsilon(\omega)$ is the dielectric function of graphene. We assumed that the thickness d of the graphene sheet is much smaller than the size of the elliptic hole. The geometrical factors in this limit are $$L_1 \approx abd \int_{\eta_1}^{\infty} \frac{d\eta'}{(\eta' + a^2) R_{\eta'}}, \qquad (7)$$

$$L_2 \approx abd \int_{\eta_1}^{\infty} \frac{d\eta'}{(\eta' + b^2) R_{\eta'}}. \qquad (8)$$

In the case of a circular hole of diameter a the polarizability simplifies to $$\alpha_{\|}(\omega) = \frac{2a^2 d\pi(\pi/2-1)}{3} \frac{\varepsilon(\omega)-\varepsilon_m}{\varepsilon_m + L_{\|}[\varepsilon(\omega)-\varepsilon_m]}, \qquad (9)$$

The LSP frequency of the hole can be determined from the equation $$\epsilon_m + L_{\|}[\epsilon(\omega)-\epsilon_m]=0, \qquad (10)$$

the condition for which the denominator of $\alpha_{\|}$ vanishes.

Figure 2:
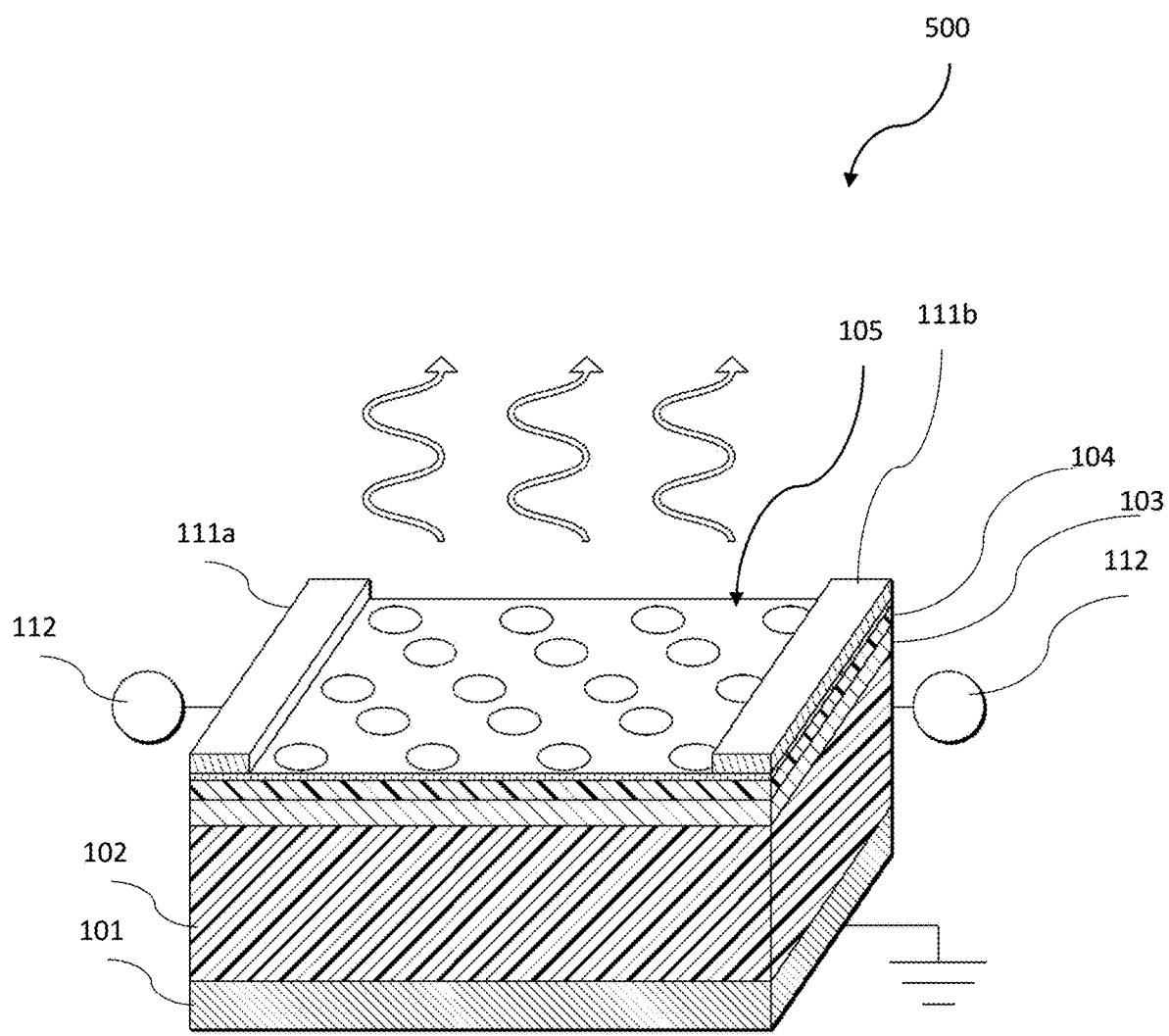
FIG. 2 is a schematic diagram of an example embodiment of the IR source, according to the present disclosure.

FIG. 2 includes a schematic showing a ultrafast mid-IR light source 500 with the materials used in our setup. The materials from top to bottom are: 1 single layer of hexagonal boron nitride (h-BN), for preventing oxidation of graphene at higher temperatures, 1 single layer of patterned graphene, 50 nm of $Si_3N_4$, for large n-doping and gating, 50 nm of ITO, metallic contact for gating, which is also transparent in mid-IR, $\lambda/4n_{SU8}$ of $SU_8$,[24] which is transparent in mid-IR, and Au back mirror. $n_{SU8}$=1.56 is the refractive index of $SU_8$.

Using the linear dispersion relation, the intraband optical conductivity is[24, 22]

$$\sigma_{intra}(\omega) = \frac{e^2}{\pi\hbar^2} \frac{2k_B T}{\tau^{-1}-i\omega} \ln\left[2\cosh\left(\frac{\varepsilon_F}{2k_B T}\right)\right], \qquad (11)$$

which in the case of $\epsilon_F \gg k_B T$ is reduced to $$\sigma_{intra}(\omega) = \frac{e^2}{\pi\hbar^2} \frac{\epsilon_F}{\tau^{-1}-i\omega} = \frac{2\varepsilon_m \omega_p^2}{\pi\hbar^2(\tau^{-1}-i\omega)}, \qquad (12)$$

where $\tau$ is determined by impurity scattering and electron-phonon interaction $\tau^{-1}=\tau_{imp}^{-1}+\tau_{e-ph}^{-1}$. Using the mobility µ of the NPG sheet, it can be presented in the form $\tau^{-1}=ev_F^2$ (µ$E_F$), where $v_F=10^6$ m/s is the Fermi velocity in graphene. $\omega_p=\sqrt{e^2\epsilon_F/2\epsilon_m}$ is the bulk graphene plasma frequency.

Figure 3:
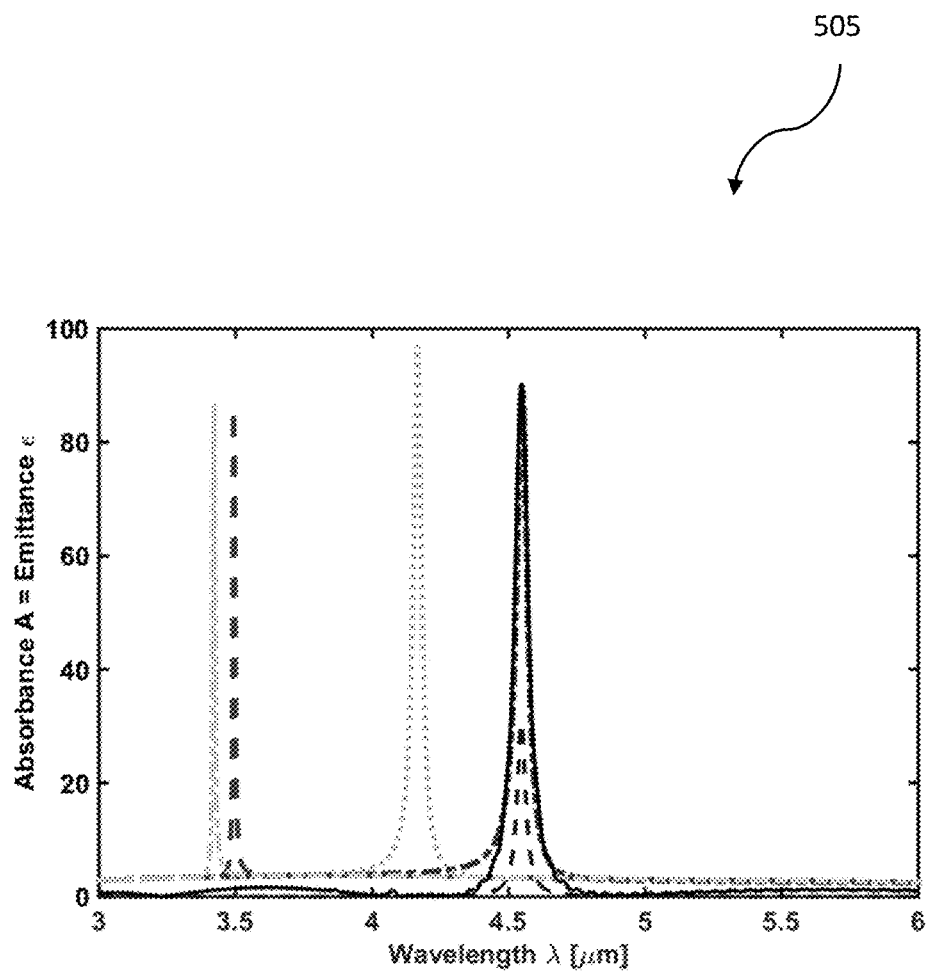
FIG. 3 is a diagram of emittance in the example embodiment of the IR source, according to the present disclosure.
Figure 4:
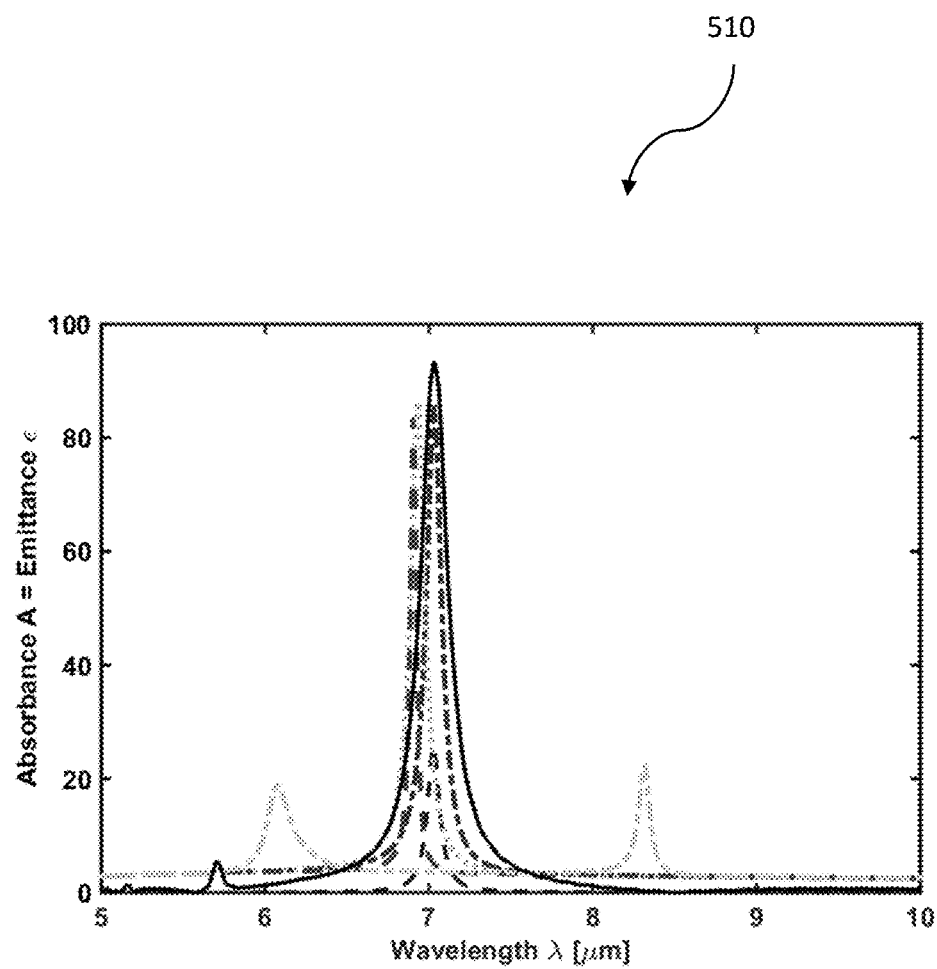
FIG. 4 is a diagram of emittance in the example embodiment of the IR source, according to the present disclosure.
Figure 5:
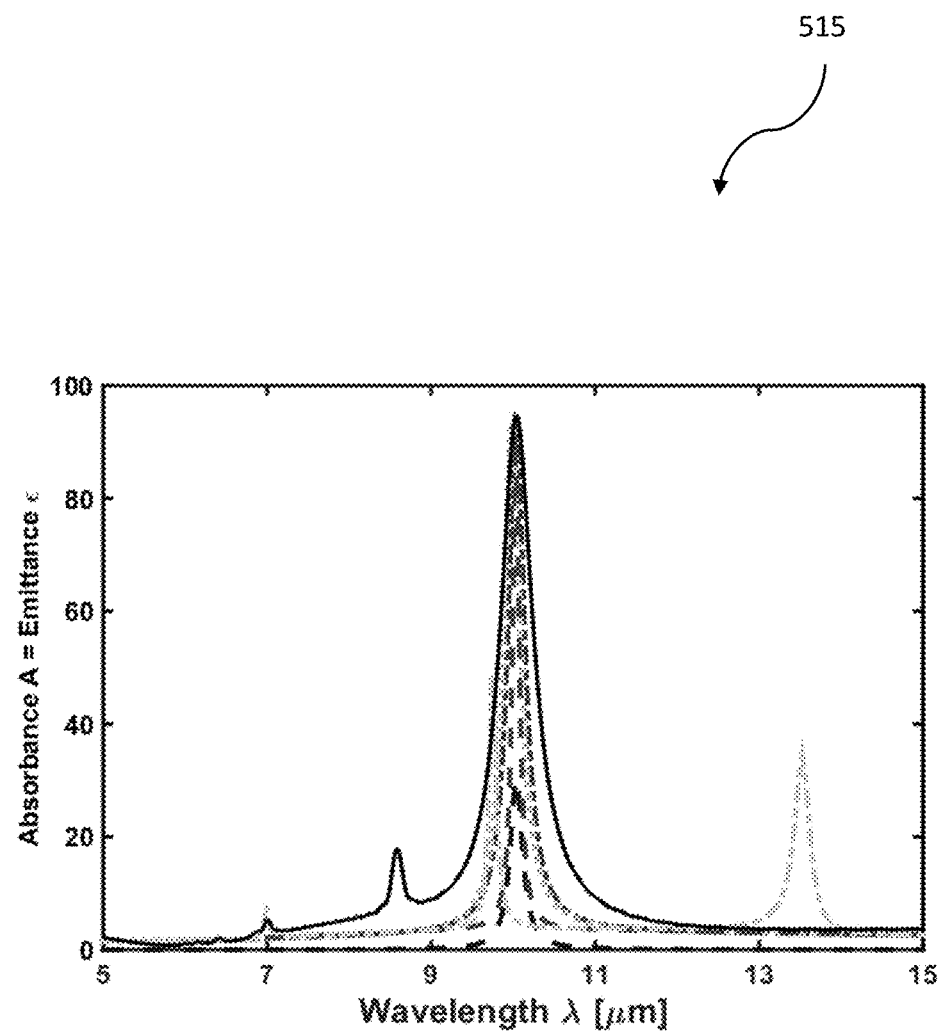
FIG. 5 is a diagram of emittance in the example embodiment of the IR source, according to the present disclosure.

It is well-known by now that hydrodynamic effects play an important role in graphene because the Coulomb interaction collision rate is dominant, i.e. $\tau_{ee}^{-1} \gg \tau_{imp}^{-1}$ and $\tau_{ee}^{-1} \gg \tau_{e-ph}^{-1}$, which corresponds to the hydrodynamic regime. $\tau_{imp}^{-1}$ and $\tau_{e-ph}^{-1}$ are the electron-impurity and electron-phonon collision rates. Since for large absorbance and emittance, we choose a large Fermi energy, we are in the Fermi liquid regime of the graphene sheet. Taking the hydrodynamic correction into account, we also consider the hydrodynamically adjusted intraband optical conductivity, [2, 7]

$$\sigma_{intra}^{HD}(\omega) = \frac{\sigma_{intra}(\omega)}{1 - \eta^2 \frac{k_\parallel^2}{\omega^2}}, \quad (13)$$

where $\eta^2 = \beta^2 + D^2\omega(\gamma + i\omega)$, $$\beta^2 \approx \frac{3}{4}v_F^2$$

is the intraband pressure velocity, $D \approx 0.4$ μm is the diffusion length in graphene, and $\gamma = \tau^{-1}$ is the relaxation rate. Interestingly, the optical conductivity becomes k-dependent and nonlocal. Also, below we will conjecture that the diffusion length D must be frequency-dependent. The effect of the hydrodynamic correction on the LSP resonances diagrams 505, 510, 515 at around $\gamma = 4$ μm, 7 μm, and 10 μm is shown in FIGS. 3, 4, and 5, respectively.

Note that since $\epsilon = 1 + X$, where X is the susceptibility, it is possible to replace $\epsilon'' = X''$. Alternatively, using the formula of the polarizability $\alpha = \epsilon_0 X$ we can write $\epsilon'' = \alpha''/\epsilon_0$. The dielectric function for graphene is given by [24, 22]

$$\varepsilon_\parallel(\omega) = \varepsilon_g - \frac{i\sigma_{2D}(\omega)}{\varepsilon_0 \omega d}, \quad (14)$$

where $\epsilon_g = 2.5$ is the dielectric constant of graphite and d is the thickness of graphene. Inserting this formula into Eq. (10) gives $$\varepsilon_m + L_\parallel \left[ \varepsilon_g - i \frac{e^2}{\pi \hbar^2} \frac{\epsilon_F}{\tau^{-1} \varepsilon_0 \omega d} - \frac{i}{\varepsilon_0 d} - \varepsilon_m \right] = 0, \quad (15)$$

Solving for the frequency and using the real part we obtain the LSP frequency, $$\text{Re}\,\omega_{LSP} = \frac{2L_\parallel^2 \varepsilon_m \omega_p^2 \tau}{\pi \hbar^2 \{L^2 + d^2\varepsilon_0^2 [L_\parallel(\varepsilon_g - \varepsilon_m) + \varepsilon_m]^2\}}, \quad (16)$$

which is linear in the Fermi energy C F.

FIG. 3 shows emittance $\epsilon(\lambda)$ [equal to absorbance $A(\mu)$] of the structure shown in FIGS. 1 and 2 with Fermi energy $E_F = -1.0$ eV, mobility $\mu = 3000$ V/cm$^2$s, hole diameter of $a = 30$ nm, and period of $\mathcal{P} = 45$ nm at T=300 K. The solid (black) curve represents the result of FDTD calculation. The dashed (blue) curve and the solid (black) curve are the emittances $\epsilon_g$ and $\epsilon_{FP}$ calculated by means of Eq. (26) and Eq. (31) for the bare NPG sheet and the whole structure including cavity, respectively. The dotted (green) line exhibits a blue-shift due to the hydrodynamic correction shown in Eq (13) with D(ν=30 THz)≈0. The blue-shifted dashed (magenta) curve and the blue-shifted dot-dashed (cyan) curve are the RPA-corrected LSP peaks due to the Coulomb interaction and the Coulomb interaction including electron-phonon interaction with the optical phonons of graphene, boron nitride, and $Si_3N_4$. This NPG sheet emits into the atmospheric transparency window between 3 and 5 μm.

Let us now consider the 2D array of circular holes in a graphene sheet. Since the dipole moments $p_j = \delta p(R_j, \omega)$ interact with each other by inducing dipole moments, we need to consider the dressed dipole moment at each site $R_j$ as source of the electric field, which is $$\tilde{p}_j = p_j + \alpha \Sigma_{j' \neq j} \mathcal{G}_{jj'} \tilde{p}_{j'}, \quad (17)$$

where $\mathcal{G}_{jj'}$ is the dipole-dipole interaction tensor. Using Bloch's theorem $p_j = p_0 \exp(ik_\parallel \cdot R_\parallel)$, the effective dipole moment becomes $$\tilde{p}_0 = p_0 + \tilde{p}_0 \alpha \sum_{j' \neq j} \mathcal{G}_{jj'} e^{ik_\parallel \cdot (R_j - R_{j'})}. \quad (18)$$

for each site j, and thus $$\tilde{p}_0 = \frac{p_0}{1 - \alpha \mathcal{G}}. \quad (19)$$

The lattice some over the dipole-dipole interaction tensor $$\mathcal{G} = \sum_{j' \neq j} \mathcal{G}_{jj'} e^{ik_\parallel \cdot (R_j - R_{j'})}$$

can be found in Ref. [27], i.e.

$$\text{Re}\,\mathcal{G} \approx g/\mathcal{P}^3, \quad (20)$$

$$\text{Im}\,\mathcal{G} = S - 2k^3/3, \quad (21)$$

where $\mathcal{P}$ is the lattice period, $$S = \frac{2\pi k}{\Omega_0} \times \begin{cases} \arccos\theta & \text{for } s \text{ polarization,} \\ \cos\theta & \text{for } p \text{ polarization.} \end{cases} \quad (22)$$

$\Omega_0$ is the unit-cell area, and the real part is valid for periods much smaller than the wavelength. The factor g=5.52 (g=4.52) for hexagonal (square) lattice. The electric field created by the effective dipole moment is determined by $$p_0 = \tilde{\alpha} E, \quad (23)$$

from which we obtain the effective polarizability of a hole in the coupled dipole approximation (CDA), $$\tilde{\alpha} = \frac{\alpha}{1 - \alpha \mathcal{G}}. \quad (24)$$

This formula is the same as in Refs. [31], [27], where the absorption of electromagnetic waves by arrays of dipole moments and graphene disks were considered, respectively. Thus, our result corroborates Kirchhoff's law (see below). Consequently, we obtain the same reflection and transmission amplitudes as in Ref. [27], i.e.

$$r = \frac{\pm iS}{\alpha^{-1} - \mathcal{G}}, t = 1 + r, \quad (25)$$

where the upper (lower) sign and $S=2\pi\omega/c\Omega_0 \cos\theta$ ($S=2\pi\omega\cos\theta/c\Omega_0$) apply to s (p) polarization. Thus, the emittance and absorbance of the bare NPG sheet are given by $$\epsilon_g = A_g = 1 - |r|^2 - |t|^2. \quad (26)$$

The coupling to the interface of the substrate with reflection and transmission amplitudes $r_0$ and $t_0$, respectively, which is located basically at the same position as the NPG sheet, yields the combined reflection and transmission amplitudes[27]

$$R = r + \frac{tt'r_0}{1 - r_0 r'}, T = \frac{tt_0}{1 - r_0 r'}, \quad (27)$$

where $r'=r$ and $t'=1-r$ are the reflection and transmission amplitudes in backwards direction, respectively. The results for the LSP resonances at around $\lambda=4$ μm, 7 μm, and 10 μm are shown in FIGS. 2, 3, and 4, respectively.

FIG. 4 shows emittance $\epsilon(\mu)$ [equal to absorbance $A(\lambda)$] of the structure shown in FIGS. 1 and 2 with Fermi energy $E_F=-1.0$ eV, mobility $\mu=3000$ V/cm$^2$s, hole diameter of a=90 nm, and period of $\mathcal{P}=150$ nm at T=300 K. The curves are denoted the same as in FIG. 2. This NPG sheet emits into the atmospheric opacity window between 5 and 8 μm.

If we include also the whole substrate including cavity and Au mirror, we need to sum over all possible optical paths in the Fabry-Perot cavity, yielding $$R_{FP} = R + TT'r_{Au} e^{i\delta} \sum_{m=0}^{\infty} r_m^m, \quad (28)$$

with $$r_m = r_{Au} R' e^{i\delta} \quad (29)$$

where $r_{Au}$ is the complex reflection amplitude of the Au mirror in the IR regime. $\delta=2kL \cos\theta$ is the phase accumulated by one back-and-forth scattering inside the Fabry-Perot cavity of length L. $k \approx n_{SU_8} k_0$ is the wavenumber inside the cavity for an external EM wave with wavenumber $k_0=2\pi/\lambda$. Since the sum is taken over a geometric series, we obtain $$R_{FP} = R + \frac{TT'rAu e^{i\delta}}{1 - r_{Au} R' e^{i\delta}}. \quad (30)$$

Since the transmission coefficient through the Au mirror can be neglected, we obtain the emittance $\epsilon$ and absorbance A including cavity, i.e.

$$\epsilon_{FP} = A_{FP} = 1 - |R_{FP}|^2. \quad (31)$$

The results for the LSP resonances at around $\lambda=4$ μm, 7 μm, and 10 μm are shown in FIGS. 2, 3, and 4, respectively.

FIG. 5 shows emittance $\epsilon(\lambda)$ [equal to absorbance $A(\lambda)$] of the structure shown in FIGS. 1 and 2 with Fermi energy $E_F=-1.0$ eV, mobility $\mu=3000$ V/cm$^2$s, hole diameter of a=300 nm, and period of $\mathcal{P}=450$ nm at T=300 K. The curves are denoted the same as in FIG. 2. This NPG sheet emits into the atmospheric transparency window between 8 and 12 μm.

Using these results, let us consider the excitation of the graphene sheet near the hole by means of thermal fluctuations, which give rise to a fluctuating EM field of a localized surface plasmon (LSP). This can be best understood by means of the fluctuation-dissipation theorem, which provides a relation between the rate of energy dissipation in a non-equilibrium system and the quantum and thermal fluctuations occurring spontaneously at different times in an equilibrium system. [21] The standard (local) fluctuation-dissipation theorem for fluctuating currents $\delta \hat{J}_\nu(r, \omega)$ in three dimensions reads $$\langle \delta \hat{J}_\mu(r, \omega) \delta \hat{J}_\nu(r', \omega') \rangle = \omega \epsilon_0 \epsilon''_{\beta\nu}(r, \omega) \Theta(\omega) \times \delta(\omega - \omega') \delta(r - r').$$

where the relative permittivity $\epsilon(r, \omega) = \epsilon'(r, \omega) + i\epsilon''(r, \omega) = f(r) \epsilon(\omega)$ and $\mu,\nu=x, y, z$ are the coordinates. Note that since $\epsilon=1+X$, where X is the susceptibility, it is possible to replace $\epsilon''=X''$. Alternatively, using the formula of the polarizability $\alpha=\epsilon_0 X$ we can write $\epsilon''=\alpha''/\epsilon_0$. f(r)=1 on the graphene sheet and 0 otherwise. Since the fluctuating currents are contained inside the two-dimensional graphene sheet, we write the local fluctuation-dissipation theorem in its two-dimensional form, i.e.

$$\langle \delta \hat{J}_\mu(r_\parallel, \omega) \delta \hat{J}_\nu(r_\parallel', \omega') \rangle = \sigma'^{2D}_{\mu\nu}(r_\parallel, \omega) \Theta(\omega) \times \delta(\omega - \omega') \delta(r_\parallel - r_\parallel'),$$

where the fluctuating current densities have units of A/m$^2$ and the coordinates are in-plane of the graphene sheet.

Using the method of dyadic Green's functions, it is possible to express the fluctuating electric field generated by the fluctuating current density by $$\delta E(r, \omega) = i\omega\mu_0 \int_\Omega G(r, r_{0\parallel}; \omega) \delta J(r_{0\parallel}, \omega) d^2 r_{0\parallel}, \quad (34)$$

where $\Omega$ is the surface of the graphene sheet. The LSP excitation around a hole can be well approximated by a dipole field such that $$\delta J(r_{0\parallel}, \omega) = -i\omega \sum_j \delta p(R_j, \omega) = -i\omega \delta p_0(\omega) \sum_j \delta(r_{0\parallel} - R_j), \quad (35)$$

where $R_j=(x_j, y_j)$ are the positions of the holes in the graphene sheet.

Figure 6:
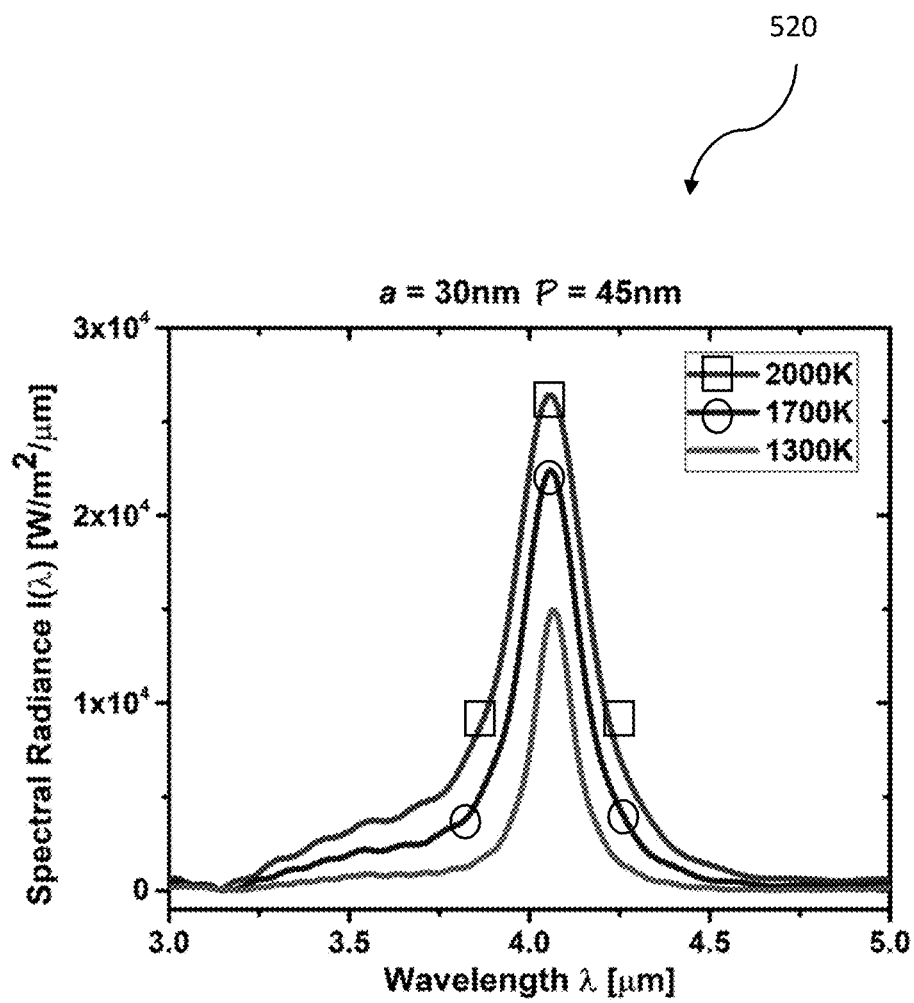
FIG. 6 is a diagram of spectral radiance in the example embodiment of the IR source, according to the present disclosure.

FIG. 6 shows spectral radiance diagram 520 of NPG including cavity, as shown in in FIGS. 1 and 2, as a function of wavelength $\lambda$ with Fermi energy $E_F=-1.0$ eV, mobility $\mu=3000$ V/cm$^2$s, hole diameter of a=30 nm, and period of $\mathcal{P}=45$ nm at 1300 K, 1700 K, and 2000 K.

Consequently, we have $$\delta E(r, \omega) = \omega^2 \mu_0 \delta p_0(\omega) \Sigma_j G(r, R_j; \omega). \quad (36)$$

The dyadic Green function is defined as $$\vec{G}(r, r'; \omega) = \left[ \overleftrightarrow{1} + \frac{1}{k(\omega)^2} \nabla\nabla \right] G(r, r'; \omega) \quad (37)$$

with the scalar Green function given by $$G(r, r'; \omega) = \frac{e^{-ik(\omega) \cdot |r-r'|}}{4\pi |r-r'|}, \quad (38)$$

and $k(\omega)^2 = (\omega^2/c^2)[\epsilon_{xx}(\omega), \epsilon_{yy}(\omega), \epsilon_{zz}(\omega)]$.

Then, the fluctuation-dissipation theorem can be recast into the forms $$\langle \delta \hat{p}_\mu(r_{0\parallel}, \omega) \delta \hat{p}_\nu^*(r_{0\parallel}, \omega') \rangle = \frac{\sigma'^{2D}_{\mu\nu}(R_i, \omega)}{\omega^2} \Theta(\omega) \delta(\omega - \omega')$$

$$\times \delta(r_{0\|} - r_{0\|}''), \quad (39)$$

and thus we obtain $$\langle \delta \hat{E}_\mu(r, \omega) \delta \hat{E}_v^*(r', \omega') \rangle = \omega^4 \mu_0^2 \sum_{m,m'} \int_\Omega d^2 r_{0\|} G_{\mu m}(r, r_{0\|}; \omega) \times \qquad (40)$$

$$\int_{\Omega'} d^2 r'_{0\|} G^*_{m'v}(r', r'_{0\|}; \omega') \langle \delta \hat{p}_m(r_0, \omega) \delta \hat{p}^*_{m'}(r_{0'}, \omega') \rangle =$$

$$\frac{\omega^2}{c^4 \varepsilon_0^2} \sum_m \int_\Omega d^2 r_{0\|} G_{\mu m}(r, r_{0\|}; \omega) G^*_{m'v}(r', r_{0\|}; \omega') \times$$

$$\Theta(\omega) \sigma'^{2D}_{mm'}(r_{0\|}, \omega) \delta(\omega - \omega') =$$

$$\frac{\omega^2}{c^4 \varepsilon_0^2} \sum_{m,j} G_{\mu m}(r, R_j; \omega) G^*_{mv}(r', R_j; \omega') \times \Theta(\omega) \sigma'^{2D}_{mm}(R_j, \omega) \delta(\omega - \omega'),$$

noting that the dielectric tensor ϵ"(r, ω) is diagonal.

Figure 7:
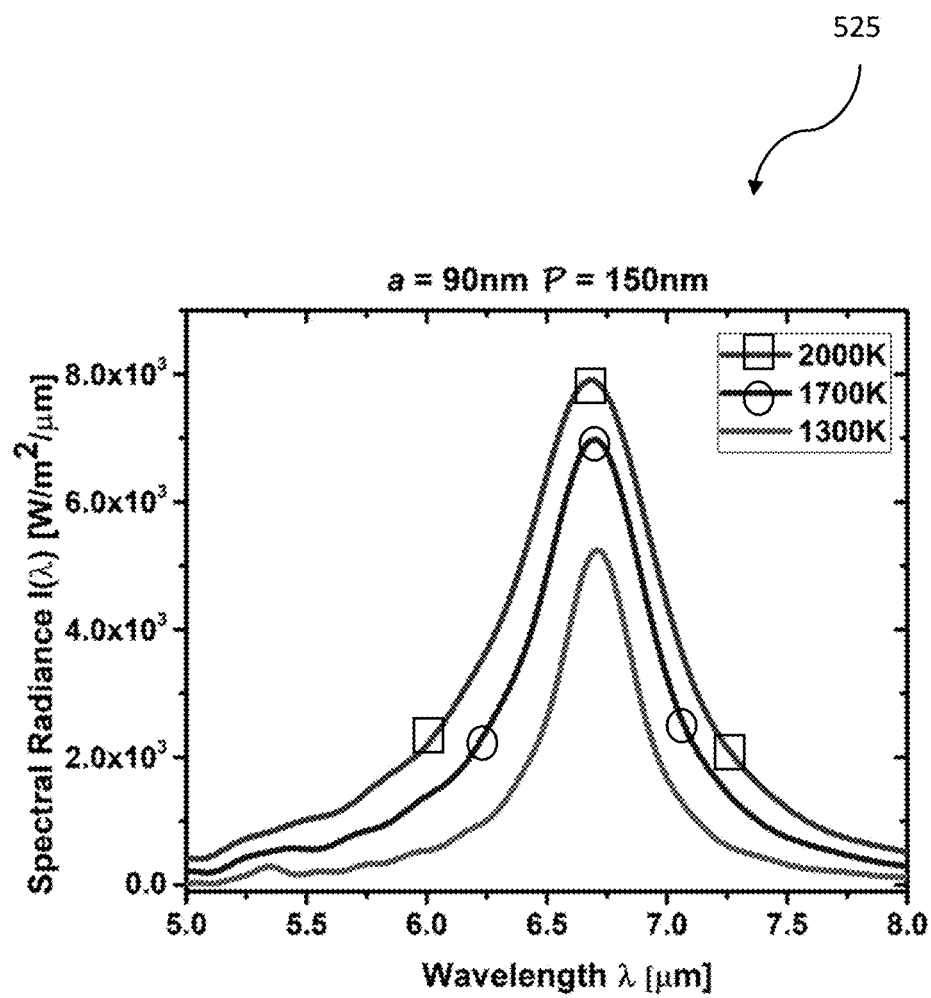
FIG. 7 is a diagram of spectral radiance in the example embodiment of the IR source, according to the present disclosure.

FIG. 7 shows spectral radiance diagram 525 of NPG including cavity, as shown in in FIGS. 1 and 2, as a function of wavelength λ with Fermi energy $E_F = -1.0$ eV, mobility it $\mu = 3000$ V/cm$^2$s, hole diameter of a=90 nm, and period of $\mathcal{P} = 150$ nm at 1300 K, 1700 K, and 2000 K.

Since the energy density of the emitted electric field at the point r is $$u(r, \omega) \delta(\omega - \omega') = \varepsilon_0 \Sigma_{i=x,y,z} \langle \delta \hat{E}^*_i(r, \omega) \delta \hat{E}_i(r, \omega') \rangle, \quad (41)$$

we can write the spectral radiance as $$I(r, \omega) = \frac{\omega^2}{4\pi^3 \varepsilon_0} \frac{1}{N} \sum_{\mu; m=x,y; j} |G_{\mu m}(r, R_j; \omega)|^2 \times \Theta(\omega) \sigma'^{2D}_{mm}(R_j, \omega) = \qquad (42)$$

$$\frac{\omega^2}{4\pi c^3 \varepsilon_0} \Theta(\omega) \sigma'^{2D}_{\|} \sum_{\mu, m} |G_{\mu m}(r, R_0; \omega)|^2,$$

assuming that the dipole current of the LSP is in the plane of the graphene sheet, i.e. the xy-plane, and the polarizability is isotropic, i.e. $\sigma'^{2D}_{\|} = \sigma'^{2D}_{xx} = \sigma'^{2D}_{yy}$, and the same for all holes. N is the number of holes. In order to obtain the spectral radiance in the far field, we need to integrate over the spherical angle. Using the results from the Supplementary Information, we obtain $$I_\infty(\omega) = \frac{\omega^2 \Theta(\omega)}{3\pi^2 \varepsilon_0 c^3} \sigma'^{2D}_{\|}(\omega) = \frac{\omega^2 \Theta(\omega)}{3c^2 \pi^2} A^{2D}_{\|}(\omega), \quad (43)$$

where we used the definition of the absorbance of a 2D material, i.e.

$$A_{2D}(\omega) = (1/\varepsilon_0 c) Re \sigma_{2D}(\omega) = (1/\varepsilon_0 c) \sigma_{2D}'(\omega), \quad (44)$$

with 2D complex conductivity $\sigma_{2D}(\omega)$. According to Kirchhoff's law, emittance ϵ(ω), absorbance A(ω), reflectance R(ω), and transmittance T(ω) are related by[16]

$$\epsilon(\omega) = A(\omega) = 1 - R(\omega) - T(\omega), \quad (45)$$

from which we obtain the grey-body thermal emission formula $$I_\infty(\omega) = \frac{\omega^2 \Theta(\omega)}{3\pi^2 c^2} \epsilon^{2D}_{\|}(\omega), \quad (46)$$

whose prefactor bears strong similarity to Planck's black body formula in Eq. (1).

Figure 8A:
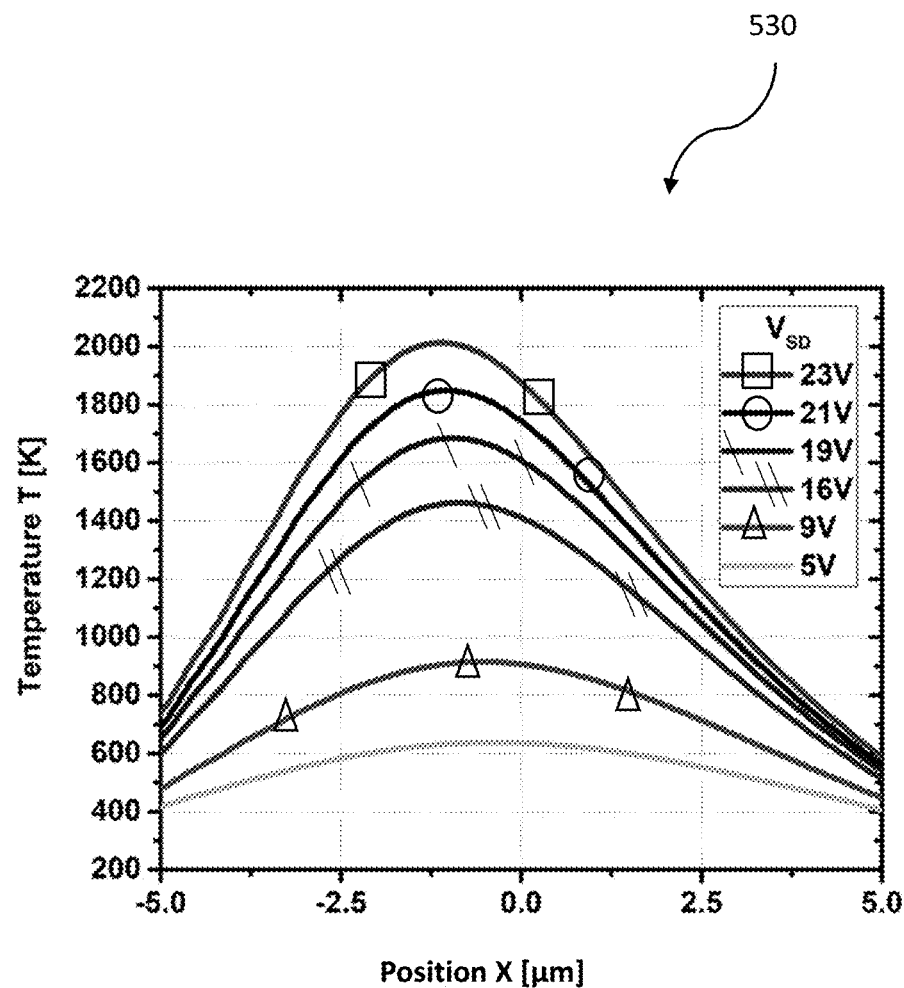
FIG. 8A is a diagram of temperature distribution in the example embodiment of the IR source, according to the present disclosure.
Figure 8B:
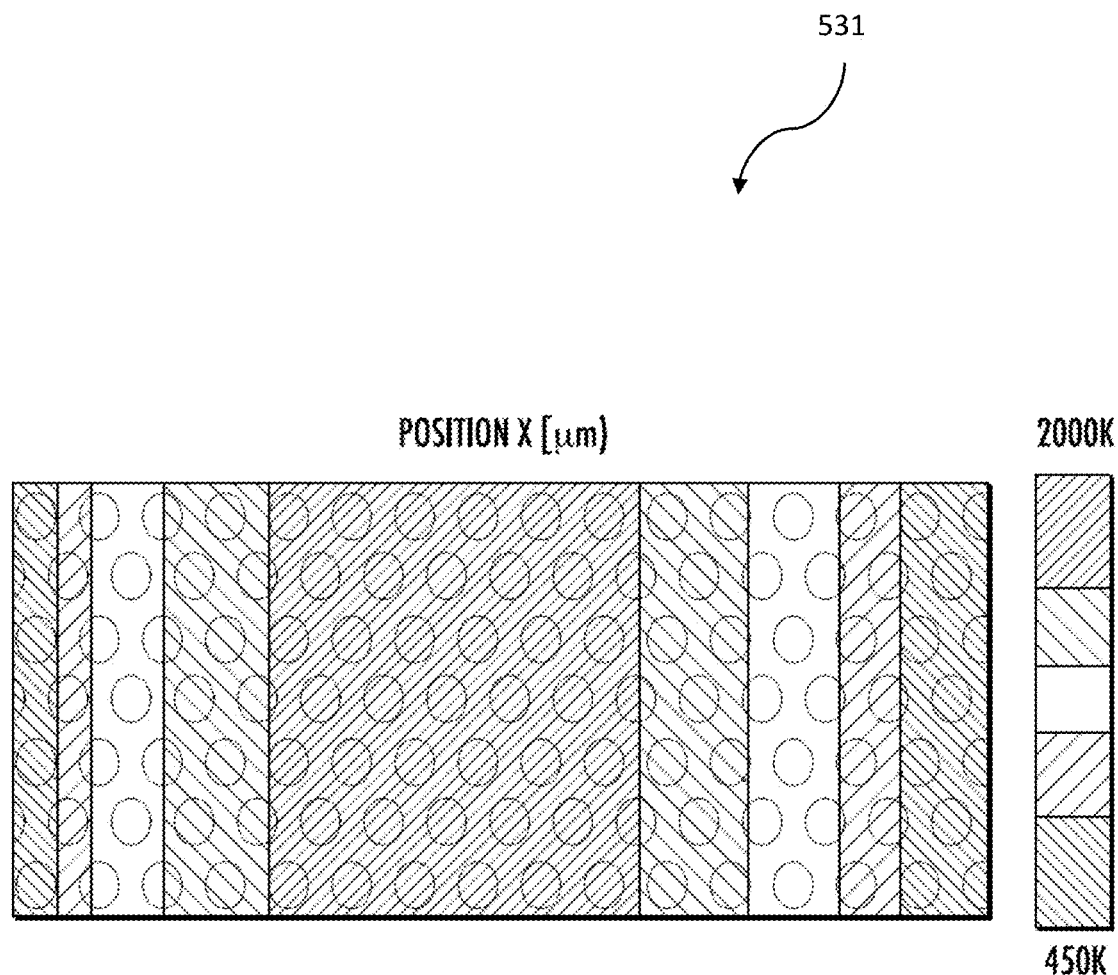
FIG. 8B is as spatial diagram of temperature distribution in the example embodiment of the IR source, according to the present disclosure.

FIGS. 8A-8B shows temperature distribution diagram 530-531 inside the NPG sheet for various values of the bias voltage $V_{SD}$, calculated by means of COMSOL. As the bias voltage is increased, the maximum of temperature shifts away from the center of the NPG sheet due to the Peltier effect.

Using FDTD to calculate the emittance $\epsilon^{2D}_{\|}(\omega)$, we evaluated the grey-body thermal emission according to Eq. (46) for the thermal emitter structure based on NPG shown in FIGS. 1 and 2. Using COMSOL, we calculated the temperature distribution inside the NPG sheet, as shown in FIG. 7, when a bias voltage $V_{SD}$ is applied, which gives rise to Joule heating. Our results are shown in FIGS. 5, 6, and 8 for the temperatures 1300 K, 1700 K, and 2000 K of NPG. After integrating over the wavelength under the curves, we obtain the following thermal emission power per area:

| Resonance wavelength | Power per area |
| --- | --- |
| 4 μm | 11,221 W/m$^2$ |
| 7 μm | 9820 W/m$^2$ |
| 10 μm | 6356 W/m$^2$ |

Figure 9:
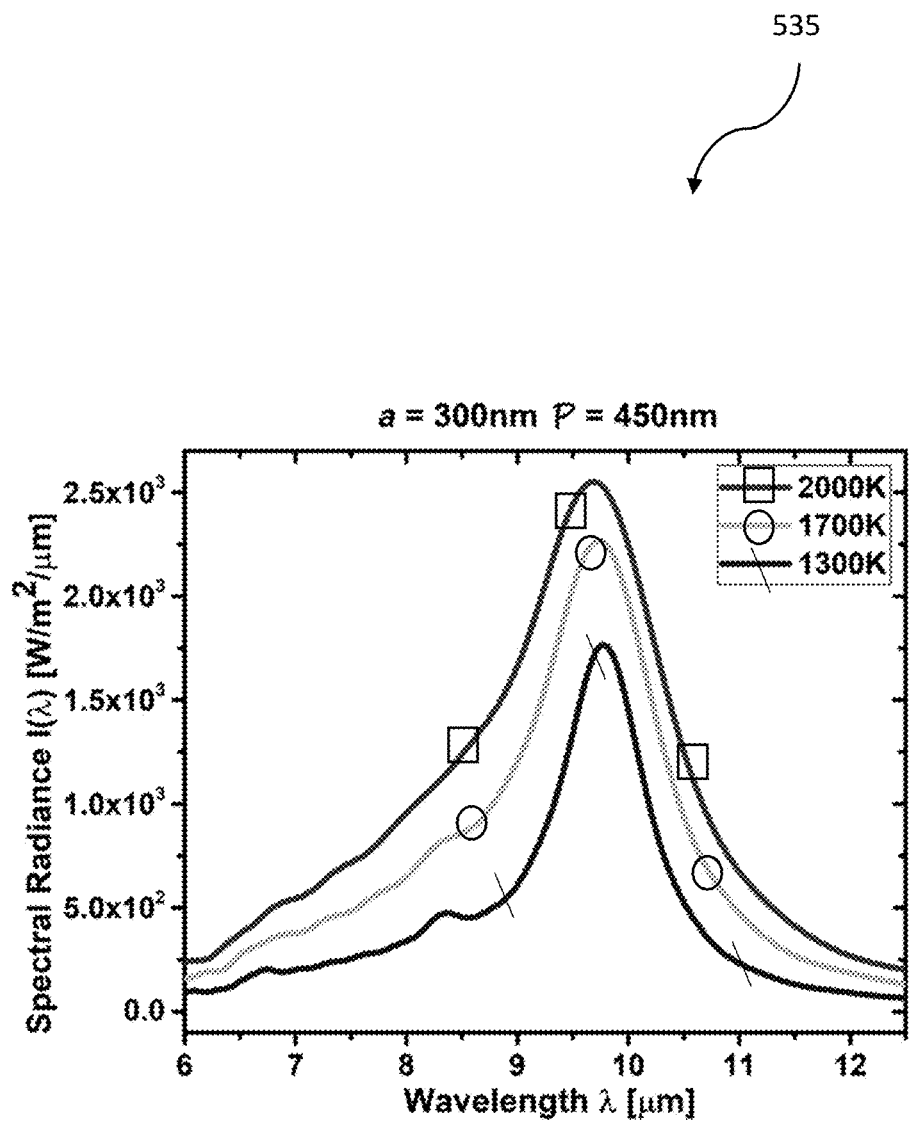
FIG. 9 is a diagram of spectral radiance in the example embodiment of the IR source, according to the present disclosure.

Let us consider the dependence of the thermal emission of NPG on the angle θ. Integrating over $r^2 \varphi$ we obtain $$I(\theta, \omega) = \frac{\omega^2}{4\pi c^2} \Theta(\omega) \frac{11 + \cos(2\theta)}{16\pi} \epsilon^{2D}_{\|}(\omega), \quad (47)$$

which is a clear deviation from a Lambert radiator. The pattern of the thermal radiation can be determined by $$\hat{I}(\theta) = \frac{\int_0^{2\pi} I(r, \omega) r^2 d\varphi}{\int_0^{2\pi} \int_0^\pi I(r, \omega) r^2 \sin\theta d\theta d\varphi} = \frac{3}{64}[11 + \cos(2\theta)], \quad (48)$$

which is shown in FIG. 9. Interestingly, since we assumed that thermal emission is completely incoherent [see Eq. (42)] the thermal emission from NPG is only weakly dependent on the emission angle θ, which can be clearly seen in FIG. 9.

FIG. 9 shows spectral radiance diagram 535 of NPG including cavity, as shown in in FIGS. 1 and 2, as a function of wavelength λ with Fermi energy $E_F = -1.0$ eV, mobility it $\mu = 3000$ V/cm$^2$s, hole diameter of a=300 nm, and period of $\mathcal{P} = 450$ nm at 1300 K, 1700 K, and 2000 K.

However, the assumption that thermal emission of radiation is incoherent is not always true. Since Kirchhoff's law is valid, thermal sources can be coherent.[11] After theoretical calculations predicted that long-range coherence may exist for thermal emission in the case of resonant surface waves, either plasmonic or phononic in nature, [5, 12, 34] experiments showed that a periodic microstructure in the polar material SiC exhibits coherence over many wavelengths and radiates in well-defined and controlled directions. Here we show that the coherence length of a graphene sheet patterned with circular holes can be as large as 150 μm due to the plasmonic wave in the graphene sheet, thereby paving the way for the creation of phased arrays made of nanoantennas represented by the holes in NPG.

The coherence of thermal emission can be best understood by means of a nonlocal response function. First, we choose the nonlocal hydrodynamic response function in Eq. (13). Using the 2D version of the fluctuation-dissipation theorem in Eq. (33), we obtain the nonlocal fluctuation-dissipation theorem in the hydrodynamic approximation, $$<\delta \hat{J}_\mu(r_\|, \omega)\delta \hat{J}_\nu(r'_\|, \omega')> = \quad (49)$$

$$\sigma_{\mu\nu}^{HD}(\Delta r_\|, \omega)\Theta(\omega)\delta(\omega-\omega') = \frac{1}{D}\int_0^\infty dk_\| \frac{\sigma_{intra}(\omega)e^{-ik_\|\Delta r_\|}}{1-\eta^2 \frac{k_\|^2}{\omega^2}}\Theta(\omega)\delta(\omega-\omega') =$$

$$\sigma_{intra}(\omega)\frac{\omega\sqrt{\pi/2}}{D\eta}\sin\left(\frac{\omega\Delta r_\|}{\eta}\right)\Theta(\omega)\delta(\omega-\omega'),$$

where $\Delta r_\| = r_\| - r'_\|$ and $\eta^2 = \beta^2 + D^2\omega(\gamma+i\omega)$. This result suggests that the coherence length is given approximately by D, which according to [2] would be D≈0.4 µm. However, the resulting broadening of the LSP resonance peaks would be very large and therefore in complete contradiction to the experimental measurements of the LSP resonance peaks in Refs. [24], [35], [25]. Thus, we conclude that the hydrodynamic diffusion length must be frequency-dependent with D(v=0)=0.4 µm. Using the Fermi velocity of $v_F = 10^6$ m/s and a frequency of v=30 THz, the average oscillation distance is about $L=v_F v^{-1}=0.033$ µm, which is much smaller than D(v=0) in graphene. Thus, we can approximate D(v=30 THz)=0. We conjecture that there is a crossover for D into the hyrdynamic regime when the frequency is reduced below around $v_0=1$ to 3 THz, below which the hydrodynamic effect leads to a strong broadening of the LSP peaks for NPG. Consequently, the viscosity of graphene should also be frequency-dependent and a crossover for the viscosity should happen at about the same frequency $v_0$. We plan to elaborate this conjecture in future work. Future experiments could corroborate our conjecture by measuring the absorbance or emittance as a function of wavelength for varying scale of patterning of the graphene sheet.

Figure 10:
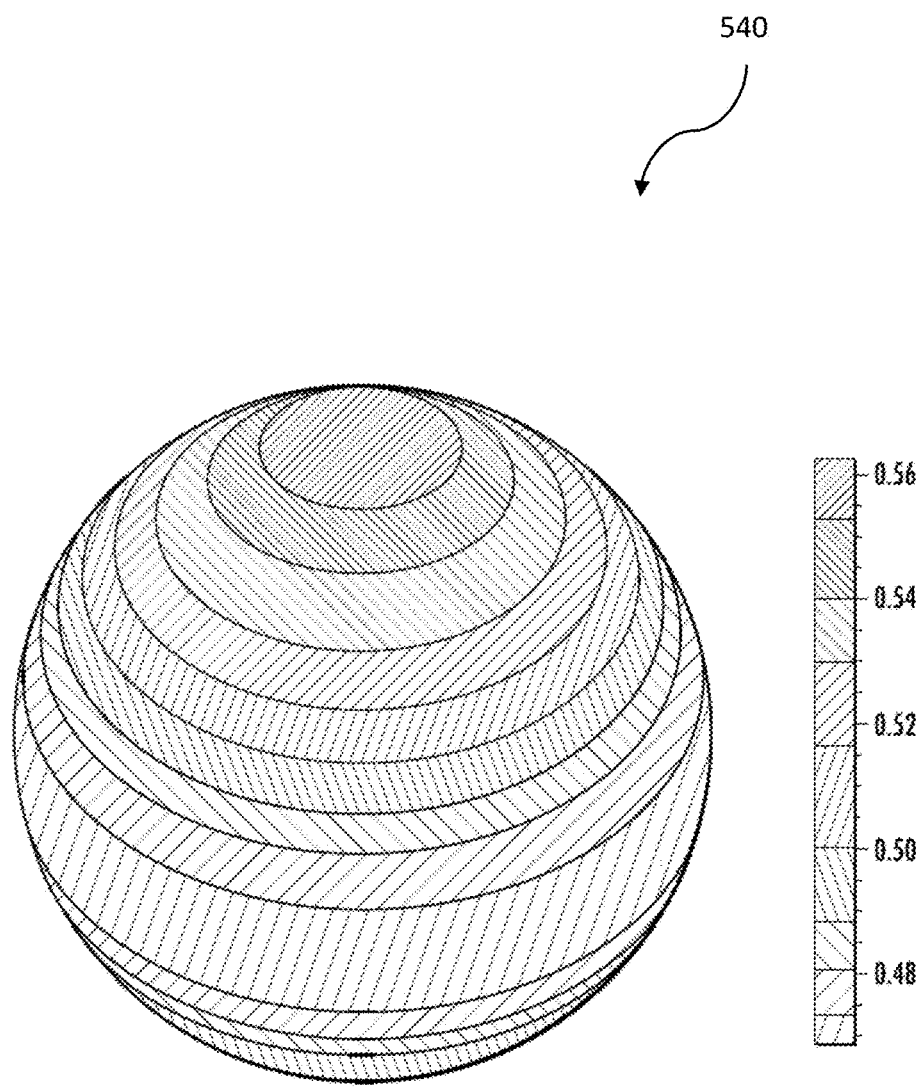
FIG. 10 is a spherical density plot in the example embodiment of the IR source, according to the present disclosure.

FIG. 10 shows a spherical density plot diagram 540 of the normalized angular intensity distribution $\hat{I}(\theta)$ of the thermal emission from NPG in the case of incoherent photons.

Next, let us consider the coherence of thermal emission by means of the nonlocal optical conductivity in the RPA approximation. Using the general formula $$\sigma(q,\omega) = \frac{ie^2\omega}{q^2}\chi^0(q,\omega), \quad (50)$$

with $$\chi^0(q,\omega) \approx \frac{\epsilon_F q^2}{\pi\hbar^2\omega(\omega+i\tau^{-1})} \quad (51)$$

in the low-temperature and low-frequency approximation, one obtains Eq. (12). Now, let us use the full polarization in RPA approximation including only the Coulomb interaction, $$\chi^{RPA}(q,\omega) = \frac{\chi^0(q,\omega)}{1-v_c(q)\chi^0(q,\omega)}, \quad (52)$$

from which we obtain $$\sigma^{RPA}(q,\omega) = \frac{ie^2\omega}{q^2}\chi(q,\omega) = \frac{ie^2\omega\epsilon_F}{\pi\hbar^2\omega(\omega+i\tau^{-1}) - \frac{e^2\epsilon_F}{2\epsilon_0}q}, \quad (53)$$

which introduces the nonlocal response via the Coulomb interaction in the denominator. The effect of the RPA correction on the LSP resonances at around λ=4 µm, 7 µm, and 10 µm is shown in FIGS. 2, 3, and 4, respectively. After taking the Fourier transform, we obtain the nonlocal fluctuation-dissipation theorem in RPA approximation, $$<\delta \hat{J}_\mu(r_\|,\omega)\delta \hat{J}_\nu(r'_\|,\omega')> = \quad (54)$$

$$\sigma_{\mu\nu}^{RPA}(\Delta r_\|,\omega)\Theta(\omega)\delta(\omega-\omega') = \frac{\sqrt{2\pi}\epsilon_0\omega}{C_{RPA}}e^{iK_{RPA}\Delta r_\| - \frac{\Delta r_\|}{C_{RPA}}}\Theta(\omega)\delta(\omega-\omega'),$$

where the coherence length in RPA approximation is $$C_{RPA} = \frac{e^2|\epsilon_F|}{2\pi\hbar^2\epsilon_0\gamma\omega}, \quad (55)$$

and the coherence wavenumber is given by $$K_{RPA} = \frac{2\pi\hbar^2\epsilon_0\omega^2}{e^2|\epsilon_F|}. \quad (56)$$

For simplicity, we switch now to a square lattice of holes. In the case of the LSP resonance for a square lattice of holes at λ=10 µm, corresponding to v=30 THz, $\epsilon_F=-1.0$ eV, ω=2πv, and $\gamma=ev_F^2/(\mu E_F)=0.3$ THz for µ=3000 cm²V⁻¹s⁻¹, which results in a coherence length of $C_{RPA}=3$ µm. This result is in reasonable agreement with the full width at half maximum (FWHM) values of the widths of the LSP resonance peaks in Refs. [24],[35],[25]. This coherence length would allow to preserve coherence for a linear array of period $\mathcal{P}=300$ nm and $C_{RPA}/\mathcal{P}=10$ holes. In order to show the coherence length that can be achieved with graphene, we can consider a suspended graphene sheet with a mobility of µ=15000 cm²V⁻¹s⁻¹. Then the coherence length increases to a value of $C_{RPA}=13$ µm, which would allow for coherence over a linear array with $C_{RPA}/\mathcal{P}=43$ holes.

Figure 11:
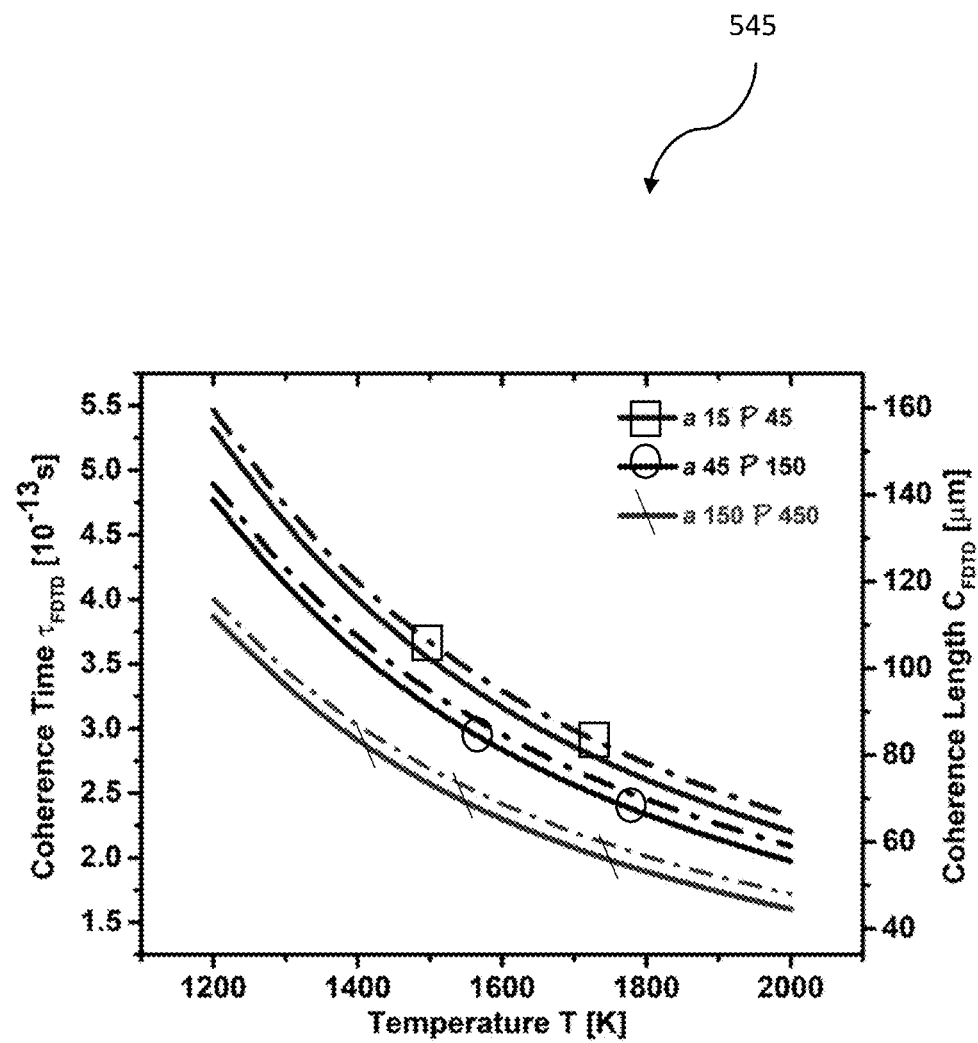
FIG. 11 is a diagram of coherence length in the example embodiment of the IR source, according to the present disclosure.
Figure 12A:
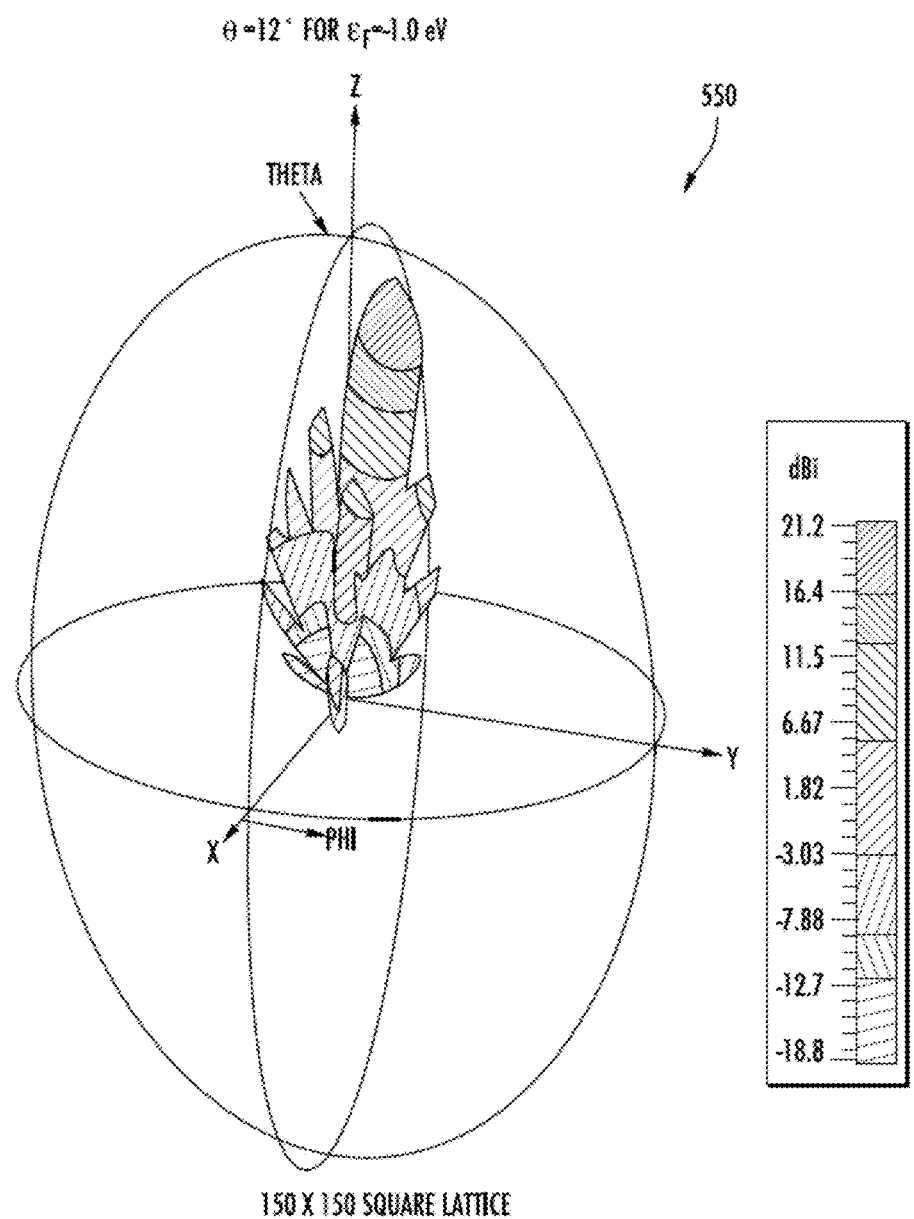
FIGS. 12A-12D are diagrams of directivity in the example embodiment of the IR source, according to the present disclosure.
Figure 12B:
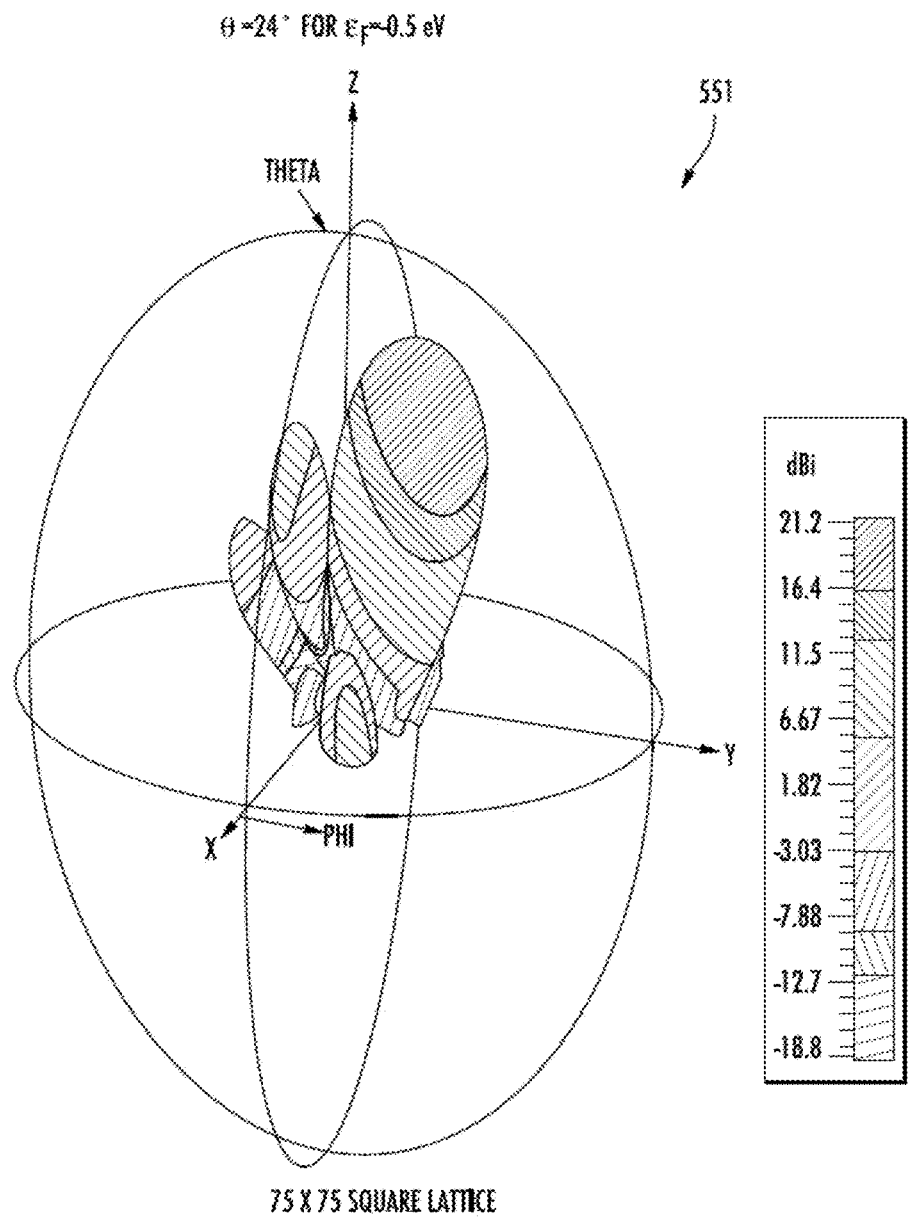
Figure 12C:
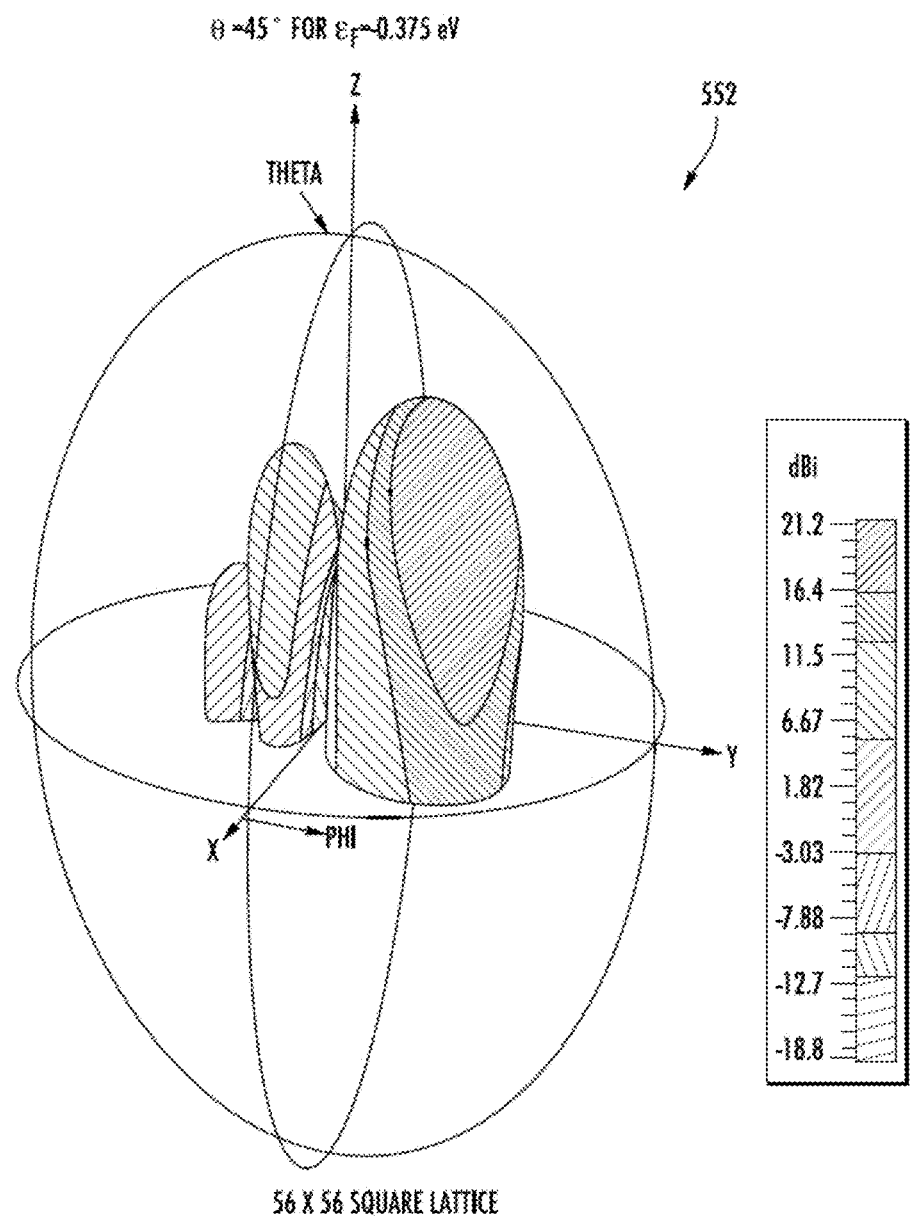
Figure 12D:
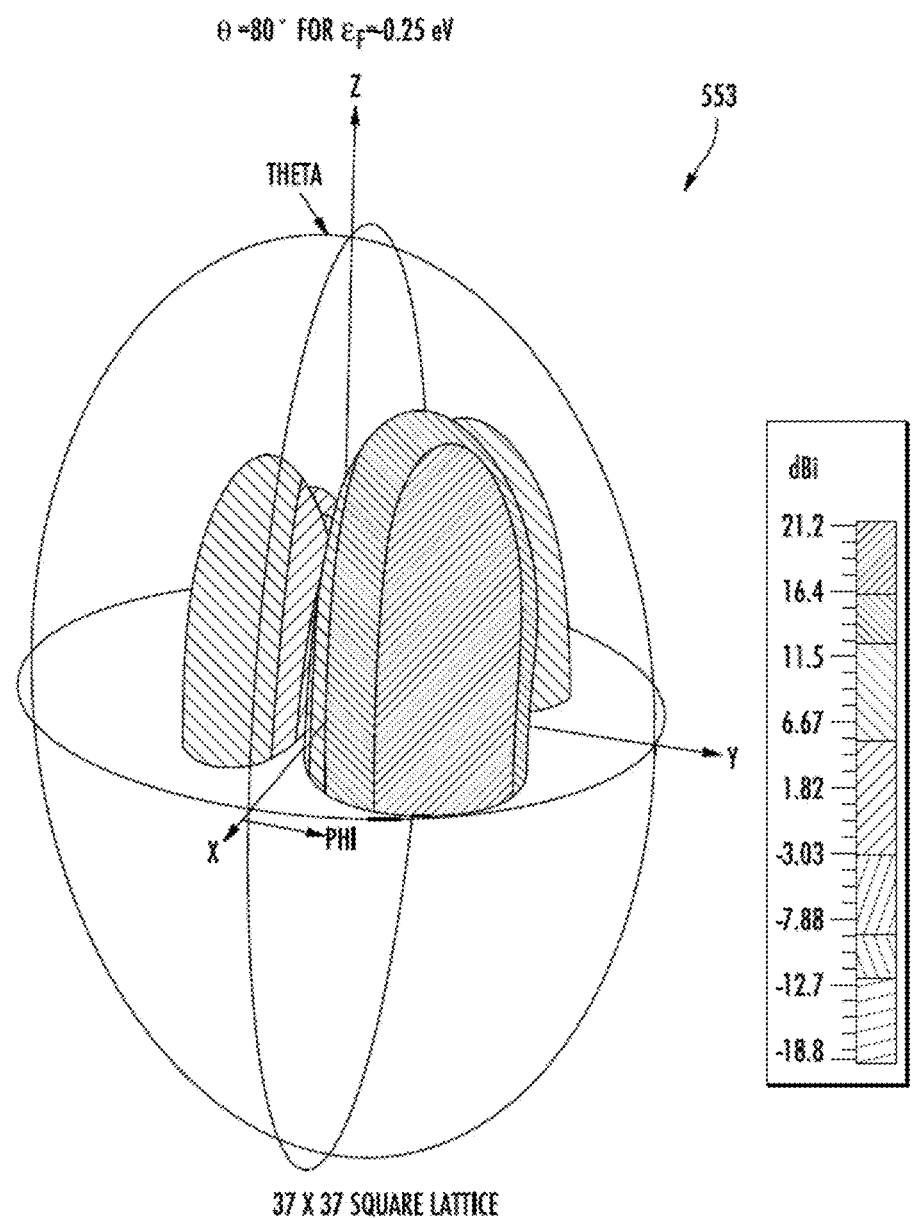

FIG. 11 shows a diagram 545 with a coherence length $C_{FDTD}$ and coherence time $\tau_{FDTD}$ of emitted photons, extracted from the full-width half-maximum (FWHM) of the spectral radiances shown in FIGS. 5, 6, and 8. In the case of the LSP resonance for a square lattice of holes at λ=5 µm, corresponding to v=60 THz, $\epsilon_F=-1.0$ eV, ω=2πv, and $\gamma=ev_F^2$ (µE_F)=0.3 THz for µ=3000 cm²V⁻¹s⁻¹, which results in a coherence length of $C_{RPA}=1.5$ µm. Considering again a suspended graphene sheet, the coherence length can be increased to $C_{RPA}=6.7$ µm. Since the period in this case is $\mathcal{P}=45$ nm, the coherence for β=3000 cm²V⁻¹s⁻¹ and β=15000 cm²V⁻¹s⁻¹ can be preserved for a linear array of $C_{RPA}/\mathcal{P}=33$ and 148 holes, respectively.

The coherence length and time of thermally emitted photons is larger because the photons travel mostly in vacuum.

Taking advantage of the Wiener-Kinchine theorem,[11] we can extract the coherence length $C_{FDTD}$ and coherence time $\tau_{FDTD}$ of thermally emitted photons by means of the full-width half-maximum (FWHM) of the spectral radiances shown in FIGS. 5, 6, and 8. Our results are shown in FIG. 10. The coherence length of the thermally emitted photons can reach up to $C_{FDTD}=150$ µm at a resonance wavelength of $\lambda=4$ µm. This means that the coherence length of the thermally emitted photons is about 37 times larger than the wavelength.

Thus, the latter large coherence length allows for the coherent control of a 150×150 square array of holes with period $\mathcal{P}=45$ nm, individually acting as nanoantennas, that can be used to create a phased array of nanoantennas. One of the intriguing properties of a phased array is that it allows to control the directivity of the emission of photons, which is currently being implemented for large 5G antennas in the 3 to 30 GHz range. The beamsteering capability of our NPG sheet is shown in FIG. 11. In contrast, our proposed phased array based on NPG can operate in the 10 to 100 THz range.

The temporal control of the individual phases of the holes requires an extraordinary fast switching time of around 1 ps, which is not feasible with current electronics. However, the nonlocal response function reveals a spatial phase shift determined by the coherence wavenumber $K_{RPA}$, which is independent of the mobility of graphene. In the case of the LSP resonance at $\lambda=4$ µm, we obtain $\lambda_{RPA}=2\pi/K_{RPA}=6$ µm, resulting in a minimum phase shift of $2\pi\,\mathcal{P}/\lambda_{RPA}=0.042=2.4°$ between neighboring holes, which can be increased to a phase shift of 9.7° by decreasing the Fermi energy to $E_F=-0.25$ eV. Thus, the phase shift between neighboring holes can be tuned arbitrarily between 2.4° and 9.7° by varying the Fermi energy between $\epsilon_F=-1.0$ eV and $\epsilon_F=-0.25$ eV. FIG. 11 shows the capability of beamsteering for our proposed structure by means of directional thermal emission, which is tunable by means of the gate voltage applied to the NPG sheet.

Due to the full control of directivity with angle of emission between $\theta=12°$ and $\theta=80°$ by tuning the Fermi energy in the range between $\ominus_F=-1.0$ eV and $\ominus_F=-0.25$ eV, thereby achieving beamsteering by means of the gate voltage, our proposed mid-IR light source based on NPG can be used not only in a vertical setup for surface emission, but also in a horizontal setup for edge emission, which is essential for nanophotonics applications.

FIGS. 12A-12D show diagram 550-553 for directivity of the thermal emission from NPG where the holes act as nanoantennas in a phased array. This emission pattern for $\epsilon_F=-1.0$ eV can be used for surface-emitting mid-IR sources. In the case of a 150×150 (diagram 550), 75×75 (diagram 551), 56×56 (diagram 552), 37×37 (diagram 553) square lattice of holes (size of lattice matches coherence length) with period $\mathcal{P}=45$ nm and hole diameter of 30 nm, introducing a relative phase of 2.43°, 4.86% 728% 9.71° between the nanoantennas allows for beamsteering in the range between $\theta=12°$ (diagram 550) and $\theta=80°$ (diagram 553) by tuning the Fermi energy in the range between $\epsilon_F=-1.0$ eV and $\epsilon_F=-0.25$ eV.

In conclusion, we have demonstrated in our theoretical study that NPG can be used to develop a plasmonically enhanced mid-IR light source with spectrally tunable selective thermal emission. Most importantly, the LSPs along with an optical cavity increase substantially the emittance of graphene from about 2% for pristine graphene to 80% for NPG, thereby outperforming state-of-the-art graphene light sources working in the visible and NIR by at least a factor of 100. Combining our proposed mid-IR light source based on patterned graphene with our demonstrated mid-IR detector based on NPG [25], we are going to develop a mid-IR spectroscopy and detection platform based on patterned graphene that will be able to detect a variety of molecules that have mid-IR vibrational resonances, such as CO, $CO_2$, NO, $NO_2$, $CH_4$, TNT, $H_2O_2$, acetone, TATP, Sarin, VX, etc. In particular, a recent study showed that it is possible to detect the hepatitis B and C viruses label-free at a wavelength of around 6 µm.[23] Therefore, we will make great effort to demonstrate that our platform will be able to detect with high sensitivity and selectivity the COVID-19 virus and other viruses that pose a threat to humanity.

Figure 13:
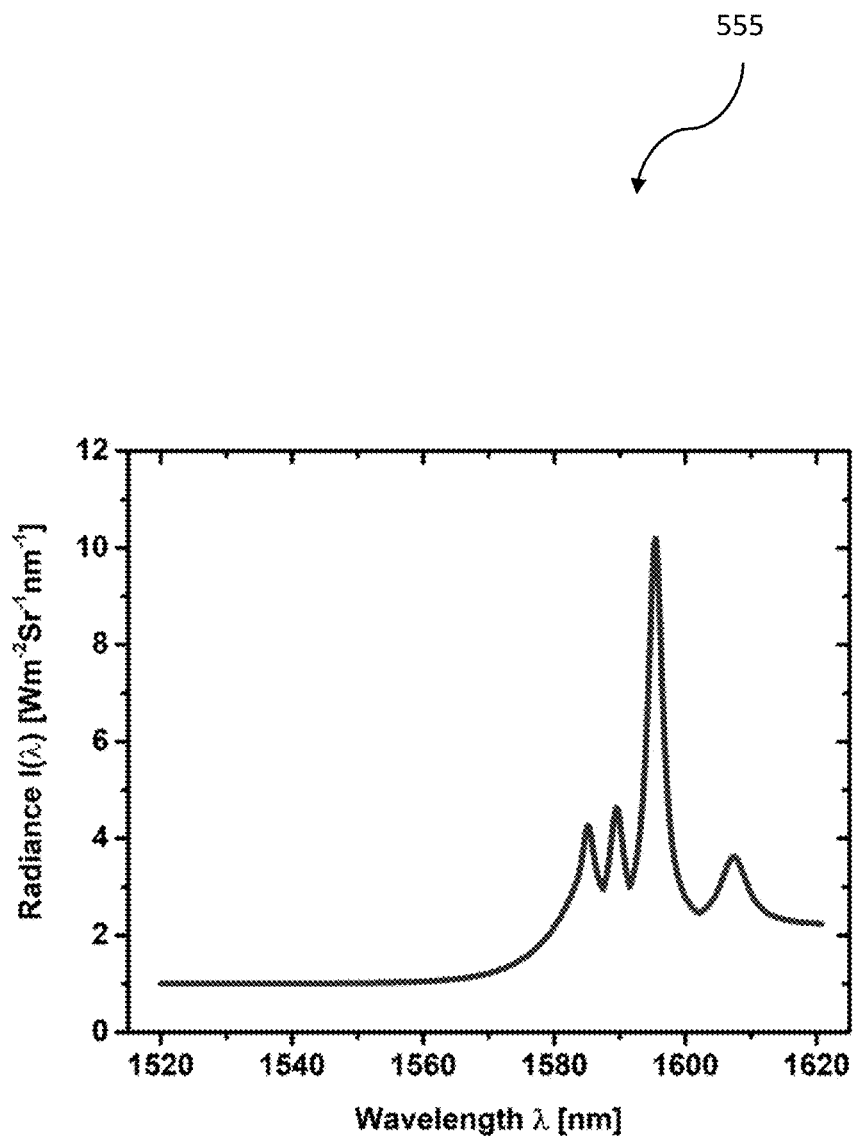
FIG. 13 is a diagram of theoretical fit to spectral radiance in the example embodiment of the IR source, according to the present disclosure.

FIG. 13 shows a diagram 555 of theoretical fit to spectral radiance presented in [26]. Shiue et al. used a photonic crystal structure to filter the thermal emission from pristine graphene with an emittance of around A=0.07. Integrating the spectral radiance under the curve gives a value of about P/A=100 W/m$^2$, which is about 100 times weaker than our proposed thermal radiation source based on NPG.

Kirchhoff's law of thermal radiation states that emittance $\epsilon$ is equal to absorbance A, i.e.

$$\epsilon(\omega, \theta, \phi, T)=A(\omega, \theta, \phi, T). \tag{57}$$

In the case of a black body $\epsilon(\omega, \theta, \phi, T)=A(\omega, \theta, \phi, T)=1$. Pristine graphene has a very small absorbance of only A=0.023 and is a nearly transparent body. Shiue et al.[26] used a photonic crystal structure to filter the thermal emission from pristine graphene with an emittance of around A=0.07. Their spectral radiance is shown in FIGS. 12A-12D and exhibits peaks at around $\lambda=1.55$ µm at a temperature of T=2000 K. After integrating the spectral radiance under the curve, one obtains an emission power per area of about P/A =100 W/m$^2$, which is about 100 times weaker than our proposed thermal radiation source based on NPG at T=2000 K. Our proposed thermal mid-IR source features an emission power per area of about P/A=10$^4$ W/m$^2$ at T=2000 K. In addition, our proposed thermal mid-IR source features frequency-tunability and beamsteering by means of a gate voltage applied to the NPG sheet.

Figure 14:
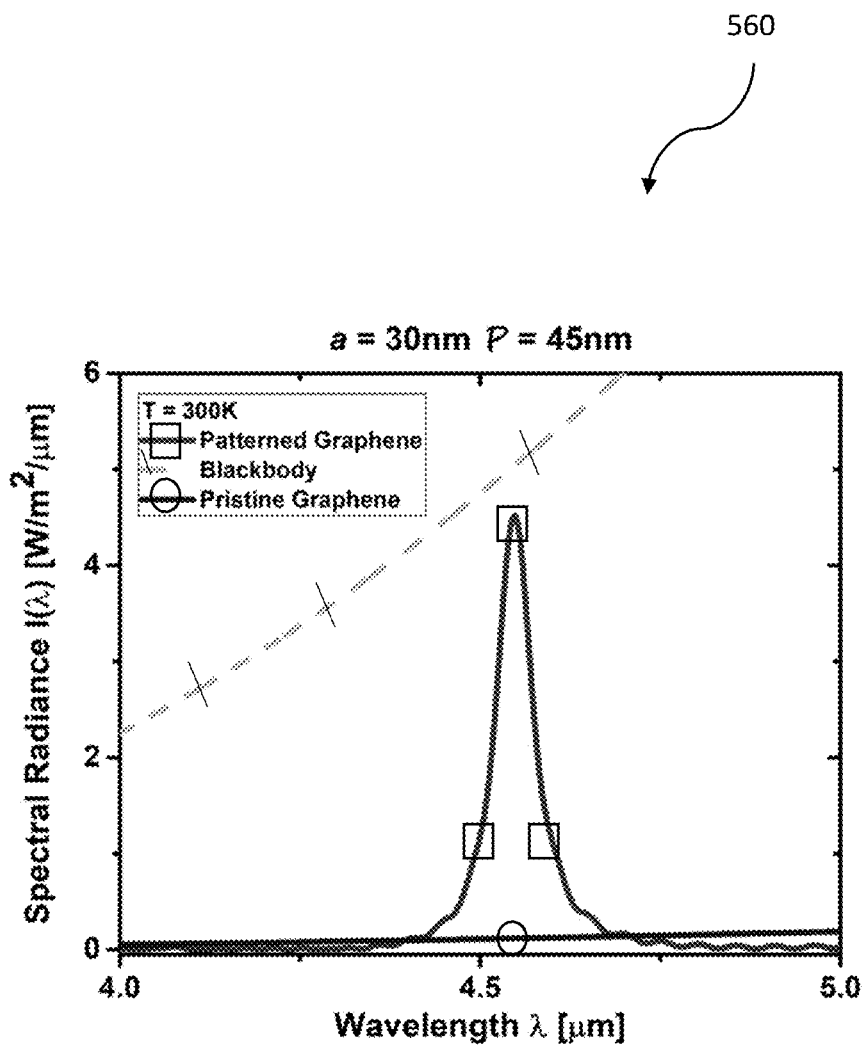
FIG. 14 is a diagram of spectral reflectance in the example embodiment of the IR source, according to the present disclosure.
Figure 15:
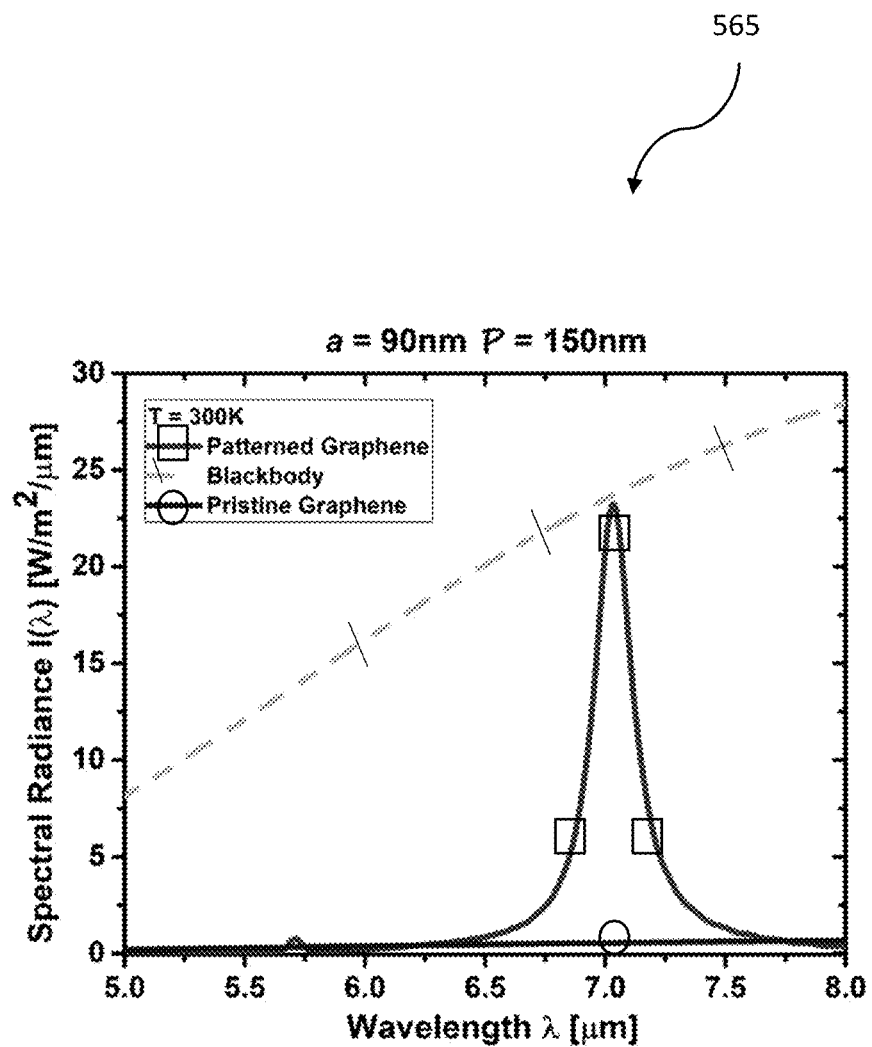
FIG. 15 is a diagram of spectral reflectance in the example embodiment of the IR source, according to the present disclosure.

FIG. 14 includes a diagram 560 showing that the NPG sheet allows for spectrally selective thermal emission at around $\lambda=4.5$ µm for a period of $\mathcal{P}=45$ nm and a hole diameter of a=30 nm. Using FDTD to calculate the emittance $\epsilon_\parallel^{2D}(\omega)$, we evaluted the grey-body thermal emission according to Eq. (46) for the thermal emitter structure based on NPG shown in FIGS. 1 and 2. Our results for the temperature T=300 K of NPG are shown in FIGS. 13, 14, and 15. In these figures we compare our results for NPG with the results for pristine graphene and black body radiation. FIG. 15 includes a diagram 565 showing that the NPG sheet allows for spectrally selective thermal emission at around $\lambda=7$ µm for a period of $\mathcal{P}=150$ nm and a hole diameter of a=90 nm.

For determining the EM properties of an infinitesimally thin conducting elliptical disk of radius R or an infinitesimally thin conducting plane with a elliptical hole, including coated structures, it is most convenient to perform the analytical calculations in the ellipsoidal coordinate system $(\xi, \eta, \zeta)$, [1, 18, 15, 4] which is related to the Cartesian coordinate system through the implicit equation $$\frac{x^2}{a^2+u}+\frac{y^2}{b^2+u}+\frac{z^2}{c^2+u}=1 \tag{58}$$

for a>b>c. The cubic roots $\xi$, $\eta$, and $\zeta$ are all real in the ranges $$-a^2\leq\zeta\leq-b^2,\ -b^2\leq\eta\leq-c^2,\ -c^2\leq\xi<\infty, \tag{59}$$

which are the ellipsoidal coordinates of a point (x,y,z). The surfaces of contant $\xi$, $\eta$, and $\zeta$ are ellipsoids, hyperboloids of one sheet, and hyperboloids of two sheets, respectively, all confocal with the ellipsoid defined by $$\frac{x^2}{a^2} + \frac{y^2}{b^2} + \frac{z^2}{c^2} = 1. \tag{60}$$

Each point (x,y,z) in space is determined by the intersection of three surfaces, one from each of the three families, and the three surfaces are orthogonal to each other. The transformation between the two coordinate systems is given by the solutions of Eq. (58), i.e.

$$x = \pm\sqrt{\frac{(\xi + a^2)(\eta + a^2)(\zeta + a^2)}{(b^2 - a^2)(c^2 - a^2)}}, \tag{61}$$

$$y = \pm\sqrt{\frac{(\xi + b^2)(\eta + b^2)(\zeta + b^2)}{(c^2 - b^2)(a^2 - b^2)}}, \tag{62}$$

$$z = \pm\sqrt{\frac{(\xi + c^2)(\eta + c^2)(\zeta + c^2)}{(a^2 - c^2)(b^2 - c^2)}}, \tag{63}$$

defining 8 equivalent octants. The length elements in ellipsoidal coordinates read $$dl^2 = h_1^2 d\xi^2 + h_2^2 d\eta^2 + h_3^2 d\zeta^2, \tag{64}$$

$$h_1 = \sqrt{\frac{(\xi - \eta)(\xi - \zeta)}{2R_\xi}}, \tag{65}$$

$$h_2 = \sqrt{\frac{(\eta - \zeta)(\xi - \zeta)}{2R_\eta}}, \tag{66}$$

$$h_3 = \sqrt{\frac{(\zeta - \xi)(\zeta - \eta)}{2R_\zeta}}, \tag{67}$$

$$R_u^2 = (u + a^2)(u + b^2)(u + c^2), \tag{68}$$

$$u = \xi, \eta, \zeta.$$

For the transformation from Cartesian to ellipsoidal coordinates, one can use the following system of equations:

$$\xi = \frac{\frac{\partial x}{\partial \xi}x + \frac{\partial y}{\partial \xi}y + \frac{\partial z}{\partial \xi}z}{\sqrt{\left(\frac{\partial x}{\partial \xi}\right)^2 + \left(\frac{\partial y}{\partial \xi}\right)^2 + \left(\frac{\partial z}{\partial \xi}\right)^2}}, \tag{69}$$

$$\eta = \frac{\frac{\partial x}{\partial \eta}x + \frac{\partial y}{\partial \eta}y + \frac{\partial z}{\partial \eta}z}{\sqrt{\left(\frac{\partial x}{\partial \eta}\right)^2 + \left(\frac{\partial y}{\partial \eta}\right)^2 + \left(\frac{\partial z}{\partial \eta}\right)^2}}, \tag{70}$$

$$\zeta = \frac{\frac{\partial x}{\partial \zeta}x + \frac{\partial y}{\partial \zeta}y + \frac{\partial z}{\partial \zeta}z}{\sqrt{\left(\frac{\partial x}{\partial \zeta}\right)^2 + \left(\frac{\partial y}{\partial \zeta}\right)^2 + \left(\frac{\partial z}{\partial \zeta}\right)^2}}, \tag{71}$$

whose elements $J_{ij}$ define the Jacobian matrix. The derivatives are explicitly:

$$\frac{\partial x}{\partial \xi} = \frac{1}{2}\sqrt{\frac{(a^2 + \eta)(a^2 + \zeta)}{(a^2 + \xi)(a^2 - b^2)(a^2 - c^2)}}, \tag{72}$$

$$\frac{\partial x}{\partial \eta} = \frac{1}{2}\sqrt{\frac{(a^2 + \xi)(a^2 + \zeta)}{(a^2 + \eta)(a^2 - b^2)(a^2 - c^2)}}, \tag{73}$$

$$\frac{\partial x}{\partial \zeta} = \frac{1}{2}\sqrt{\frac{(a^2 + \xi)(a^2 + \eta)}{(a^2 + \zeta)(a^2 - b^2)(a^2 - c^2)}}, \tag{74}$$

$$\frac{\partial y}{\partial \xi} = \frac{1}{2}\sqrt{\frac{(b^2 + \eta)(b^2 + \zeta)}{(b^2 + \xi)(b^2 - a^2)(b^2 - c^2)}}, \tag{75}$$

$$\frac{\partial y}{\partial \eta} = \frac{1}{2}\sqrt{\frac{(b^2 + \xi)(b^2 + \zeta)}{(b^2 + \eta)(b^2 - a^2)(b^2 - c^2)}}, \tag{76}$$

$$\frac{\partial y}{\partial \zeta} = \frac{1}{2}\sqrt{\frac{(b^2 + \xi)(b^2 + \eta)}{(b^2 + \zeta)(b^2 - a^2)(b^2 - c^2)}}, \tag{77}$$

$$\frac{\partial z}{\partial \xi} = \frac{1}{2}\sqrt{\frac{(c^2 + \eta)(c^2 + \zeta)}{(c^2 + \xi)(c^2 - a^2)(c^2 - b^2)}}, \tag{78}$$

$$\frac{\partial z}{\partial \eta} = \frac{1}{2}\sqrt{\frac{(c^2 + \xi)(c^2 + \zeta)}{(c^2 + \eta)(c^2 - a^2)(c^2 - b^2)}}, \tag{79}$$

$$\frac{\partial z}{\partial \zeta} = \frac{1}{2}\sqrt{\frac{(c^2 + \xi)(c^2 + \eta)}{(c^2 + \zeta)(c^2 - a^2)(c^2 - b^2)}}.$$

Figure 16:
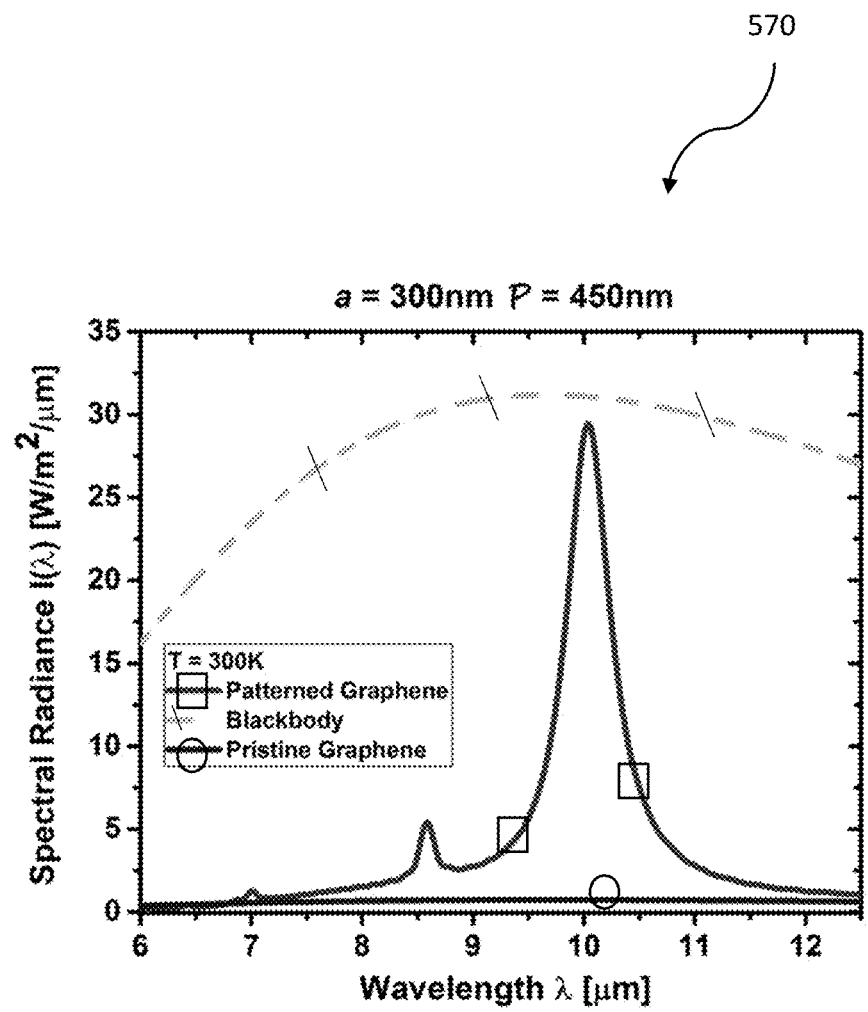
FIG. 16 is a diagram of spectral reflectance in the example embodiment of the IR source, according to the present disclosure.

FIG. 16 includes a diagram 570 showing that the NPG sheet allows for spectrally selective thermal emission at around $\lambda=10$ μm for a period of $\mathcal{P}=450$ nm and a hole diameter of a=300 nm. The coordinate $\eta$ is constant on the surfaces of oblate spheroids defined by $$\frac{x^2 + y^2}{(R\cosh\eta)^2} + \frac{z^2}{(R\sinh\eta)^2} = 1 \tag{81}$$

The surface associated with the limit $\eta \to 0$ is an infinitesimally thin circular disk of radius R. In contrast, the surface in the limit $\eta \gg 1$ is a sphere of radius $r = R\cosh\eta \approx R\sinh\eta$. Thus, the Laplace equation in ellipsoidal coordinates reads $$\Delta\Phi = \frac{4}{(\xi - \eta)(\zeta - \xi)(\eta - \zeta)}\left[(\eta - \zeta)R_\xi \frac{\partial}{\partial \xi}\left(R_\xi \frac{\partial\Phi}{\partial \xi}\right) + \right. \tag{82}$$

$$\left. (\zeta - \xi)R_\eta \frac{\partial}{\partial \eta}\left(R_\eta \frac{\partial\Phi}{\partial \eta}\right) + (\xi - \eta)R_\zeta \frac{\partial}{\partial \zeta}\left(R_\zeta \frac{\partial\Phi}{\partial \zeta}\right)\right] = 0.$$

The surface of the conducting ellipsoid is defined by $\xi=0$. Thus, the electric field potential $\Phi(\xi)$ is a function of $\xi$ only, thereby defining the equipotential surfaces by confocal ellipsoids. Laplace's equation is then simplified to $$\frac{d}{d\xi}\left(R_\xi \frac{d\Phi}{d\xi}\right) = 0. \tag{83}$$

The solution outside the ellipsoid is $$\Phi_{out}(\xi) = A \int_\xi^\infty \frac{d\xi'}{R_{\xi'}}. \tag{84}$$

From the asymptotic approximation $\xi \approx r^2$ for large distances $r \to \infty$, i.e. $\xi \to \infty$, we identify $R_\xi \approx \xi^{3/2}$ and thus $$\Phi_{out}(\xi \to \infty) \approx \frac{2A}{\sqrt{\xi}} = \frac{2A}{r}. \tag{85}$$

using the boundary condition $\lim_{\xi \to \infty} \Phi(\xi) = 0$. Since the Coulomb field should be $\Phi(\xi \to \infty) \approx e/r$ at large distances from the ellipsoid, $2A = e$ and $$\Phi_{out}(\xi) = \frac{e}{2} \int_\xi^\infty \frac{d\xi'}{R_{\xi'}} \tag{86}$$

is obtained, corresponding to the far-field of a monopole charge.

The solution inside the ellipsoid is $$\Phi_{in}(\xi) = B \int_{-c^2}^\xi \frac{d\xi'}{R_{\xi'}}. \tag{87}$$

Using the asymptotic approximation $R_{\xi \to -c^2} \propto \sqrt{\xi + c^2}$ we obtain $$\Phi_{in}(\xi \to -c^2) \approx B\sqrt{\xi + c^2} \tag{88}$$

This solution satisfies the boundary condition $\lim_{\xi \to -c^2} \Phi(\xi) = 0$. The constant $B$ can be found from the boundary condition $\Phi(\xi = 0) = V$, where $V$ is the potential on the surface of the charged ellipsoid. Thus, $B = V/c$ and $$\Phi_{in}(\xi) = \frac{V}{c}\sqrt{\xi + c^2}. \tag{89}$$

Following Ref. Bohren 1998, let us consider the case when the external electric field is parallel to one of the major axes of the ellipsoid. For the external potential let us choose $$\Phi_0 = -E_0 z = -E_0 \sqrt{\frac{(\xi + c^2)(\eta + c^2)(\zeta + c^2)}{(a^2 - c^2)(b^2 - c^2)}} \tag{90}$$

Let $\Phi_p$ be the potential caused by the ellipsoid, with the boundary condition $\Phi_p(\xi \to \infty) = 0$. Requiring continuous boundary condition on the surface of the ellipsoid, we have $$\Phi_{in}(0, \eta, \zeta) = \Phi_0(0, \eta, \zeta) + \Phi_p(0, \eta, \zeta). \tag{91}$$

We make the ansatz $$\Phi_p(\xi, \eta, \zeta) = F_p(\xi)\sqrt{(\eta + c^2)(\zeta + c^2)}, \tag{92}$$

which after insertion into the Laplace equation yields $$R_\xi \frac{d}{d\xi}\left[R_\xi \frac{dF}{d\xi}\right] - \left(\frac{a^2 + b^2}{4} + \frac{\xi}{2}\right)F(\xi) = 0. \tag{93}$$

Thus, one obtains for the field caused by the ellipsoid $$\Phi_p(\xi, \eta, \zeta) = C_p F_p(\xi)\sqrt{(\eta + c^2)(\zeta + c^2)} \tag{94}$$

with $$F_p(\xi) = F_{in}(\xi) \int_\xi^\infty \frac{d\xi'}{F_{in}^2(\xi')R_{\xi'}}, \tag{95}$$

where $$F_{in}(\xi) = \sqrt{\xi + c^2}, \tag{96}$$

the function we used in the case of the charged ellipsoid (see above). Thus, the field inside the ellipsoid is given by $$\Phi_{in} = C_{in} F_{in}(\xi)\sqrt{(\eta + c^2)(\zeta + c^2)}, \tag{97}$$

Using the boundary condition shown in Eq. (91), one obtains the first equation $$C_p \int_0^\infty \frac{d\xi'}{(c^2 + \xi')R_{\xi'}} - C_{in} = \frac{E_0}{\sqrt{(a^2 - c^2)(b^2 - c^2)}} \tag{98}$$

The boundary condition of the normal component of $D$ at $\xi = 0$, equivalent to $$\varepsilon_{in} \frac{\partial \Phi_{in}}{\partial \xi} = \varepsilon_m \frac{\partial \Phi_0}{\partial \xi} + \varepsilon_m \frac{\partial \Phi_p}{\partial \xi}, \tag{99}$$

yields the second equation $$\varepsilon_m C_p \left[\int_0^\infty \frac{d\xi'}{(c^2 + \xi')R_{\xi'}} - \frac{2}{abc}\right] - \varepsilon_{in} C_{in} = \frac{\varepsilon_m E_0}{\sqrt{(a^2 - c^2)(b^2 - c^2)}}. \tag{100}$$

Consequently, the potentials are $$\Phi_{in} = \frac{\Phi_0}{1 + \frac{L_3(\varepsilon_{in} - \varepsilon_m)}{\varepsilon_m}}, \tag{101}$$

$$\Phi_p = \Phi_0 \frac{\frac{abc\varepsilon_m - \varepsilon_{in}}{2\varepsilon_m}\int_\xi^\infty \frac{d\xi'}{(c^2 + \xi')R_{\xi'}}}{1 + \frac{L_3(\varepsilon_{in} - \varepsilon_m)}{\varepsilon_m}}, \tag{102}$$

where $$L_3 = \frac{abc}{2}\int_0^\infty \frac{d\xi'}{(c^2 + \xi')R_{\xi'}} \tag{103}$$

Far away from the ellipsoid for $\xi \approx r^2 \to \infty$, one can use the approximation $$\int_\xi^\infty \frac{d\xi'}{(c^2 + \xi')R_{\xi'}} \approx \int_\xi^\infty \frac{d\xi'}{\xi'^{5/2}} = \frac{2}{3}\xi^{-3/2}, \tag{104}$$

yielding the potential caused by the ellipsoid, i.e.

$$\Phi_p \approx \frac{E_0\cos\theta}{r^2} \frac{\frac{abc\varepsilon_{in} - \varepsilon_m}{3\;\varepsilon_m}}{1 + \frac{L_3(\varepsilon_{in} - \varepsilon_m)}{\varepsilon_m}}, \quad (105)$$

from which we identify the dipole moment $$p = pz = 4\pi\varepsilon_m abc \frac{\varepsilon_{in} - \varepsilon_m}{3\varepsilon_m + 3L_3(\varepsilon_{in} - \varepsilon_m)} E_0 z. \quad (106)$$

This result determines the polarizability of the charged ellipsoid, i.e.

$$\alpha_3 = 4\pi\varepsilon_m abc \frac{\varepsilon_{in} - \varepsilon_m}{3\varepsilon_m + 3L_3(\varepsilon_{in} - \varepsilon_m)} \quad (107)$$

If the external electric field is applied along the other major axes of the ellipsoid, x or y, the polarizabilities are $$\alpha_1 = 4\pi\varepsilon_m abc \frac{\varepsilon_{in} - \varepsilon_m}{3\varepsilon_m + 3L_1(\varepsilon_{in} - \varepsilon_m)}, \quad (108)$$

$$\alpha_2 = 4\pi\varepsilon_m abc \frac{\varepsilon_{in} - \varepsilon_m}{3\varepsilon_m + 3L_2(\varepsilon_{in} - \varepsilon_m)}, \quad (109)$$

respectively, where $$L_1 = \frac{abc}{2} \int_0^\infty \frac{d\xi'}{(a^2 + \xi')R_{\xi'}}, \quad (110)$$

$$L_2 = \frac{abc}{2} \int_0^\infty \frac{d\xi'}{(b^2 + \xi')R_{\xi'}}. \quad (111)$$

For oblate spheroids (a=b), $L_1 = L_2$, $$L_1 = \frac{g(e_o)}{2e_o^2}\left[\frac{\pi}{2} - \arctan g(e_o)\right] - \frac{g^2(e_o)}{2}, \quad (112)$$

$$g(e_o) = \sqrt{\frac{1 - e_o^2}{e_o^2}}, \; e_o^2 = 1 - \frac{c^2}{a^2},$$

where $e_o$ is the eccentricity of the oblate spheroid. The limiting cases of an infinitesimally thin disk and a sphere are obtained for $e_o=1$ and $e_o=0$, respectively.

The geometrical factors $L_i$ are related to the depolarization factors $\hat{L}_i$ by $$E_{inx} = E_{0x} - \hat{L}_1 P_{inx}, \quad (113)$$

$$E_{iny} = E_{0y} - \hat{L}_2 P_{iny}, \quad (114)$$

$$E_{inz} = E_{0z} - \hat{L}_3 P_{inz}, \quad (115)$$

with $$\hat{L}_i = \frac{\varepsilon_{in} - \varepsilon_m}{\varepsilon_{in} - \varepsilon_0} \frac{L_i}{\varepsilon_m}. \quad (116)$$

In analogy to Ref. [4], let us consider the case when the external electric field is parallel to one of the major axes of the ellipsoid, in this case along the x-axis. For the external potential let us choose $$\Phi_0 = -E_0 x = -E_0 \sqrt{\frac{(\xi + a^2)(\eta + a^2)(\zeta + a^2)}{(b^2 - a^2)(c^2 - a^2)}}. \quad (117)$$

Let $\Phi_p$ be the potential caused by the ellipsoid, with the boundary condition $\Phi_p(\xi \to \infty) = 0$. Requiring continuous boundary condition on the surface of the ellipsoid, we have $$\Phi_{in}(0, \eta, \zeta) = \Phi_0(0, \eta, \zeta) + \Phi_p(0, \eta, \zeta). \quad (118)$$

Thus, one obtains for the field caused by the ellipsoid $$\Phi_p(\xi, \eta, \zeta) = C_p F_p(\xi) \sqrt{(\eta + a^2)(\zeta + a^2)} \quad (119)$$

with $$F_p(\xi) = F_{in}(\xi) \int_\xi^\infty \frac{d\xi'}{F_{in}^2(\xi') R_{\xi'}}, \quad (120)$$

where $$F_{in}(\xi) = \sqrt{\xi + a^2}, \quad (121)$$

the function we used in the case of the charged ellipsoid (see above). Thus, the field inside the ellipsoid is given by $$\Phi_{in} = C_{in} F_{in}(\xi) \sqrt{(\eta + a^2)(\zeta + a^2)}, \quad (122)$$

Using the boundary condition shown in Eq. (118), one obtains the first equation $$C_p \int_0^\infty \frac{d\xi'}{(a^2 + \xi') R_{\xi'}} - C_{in} = \frac{E_0}{\sqrt{(b^2 - a^2)(c^2 - a^2)}} \quad (123)$$

The boundary condition of the normal component of D at $\xi=0$, equivalent to $$\varepsilon_{in} \frac{\partial \Phi_{in}}{\partial \xi} = \varepsilon_m \frac{\partial \Phi_0}{\partial \xi} + \varepsilon_m \frac{\partial \Phi_p}{\partial \xi}, \quad (124)$$

yields the second equation $$\varepsilon_m C_p \left[\int_0^\infty \frac{d\xi'}{(a^2 + \xi') R_{\xi'}} - \frac{2}{abc}\right] - \varepsilon_{in} C_{in} = \frac{\varepsilon_m E_0}{\sqrt{(b^2 - a^2)(c^2 - a^2)}}. \quad (125)$$

Consequently, the potentials are $$\Phi_{in} = \frac{\Phi_0}{1 + \frac{L_1(\varepsilon_{in} - \varepsilon_m)}{\varepsilon_m}}, \quad (126)$$

$$\Phi_p = \Phi_0 \frac{\frac{abc}{2} \frac{\varepsilon_m - \varepsilon_{in}}{\varepsilon_m} \int_\xi^\infty \frac{d\xi'}{(a^2 + \xi') R_{\xi'}}}{1 + \frac{L_1(\varepsilon_{in} - \varepsilon_m)}{\varepsilon_m}}, \quad (127)$$

where $$L_1 = \frac{abc}{2} \int_0^\infty \frac{d\xi'}{(a^2 + \xi')R_{\xi'}}. \tag{128}$$

Far away from the ellipsoid for $\xi \approx r^2 \to \infty$, one can use the approximation $$\int_\xi^\infty \frac{d\xi'}{(a^2 + \xi')R_{\xi'}} \approx \int_\xi^\infty \frac{d\xi'}{\xi'^{5/2}} = \frac{2}{3}\xi^{-3/2}, \tag{129}$$

yielding the potential caused by the ellipsoid, i.e.

$$\Phi_p \approx \frac{E_0 \cos\theta}{r^2} \frac{\frac{abc}{3} \frac{\varepsilon_{in} - \varepsilon_m}{\varepsilon_m}}{1 + \frac{L_1(\varepsilon_{in} - \varepsilon_m)}{\varepsilon_m}}, \tag{130}$$

from which we identify the dipole moment $$p = px = 4\pi\varepsilon_m abc \frac{\varepsilon_{in} - \varepsilon_m}{3\varepsilon_m + 3L_1(\varepsilon_{in} - \varepsilon_m)} E_0 x. \tag{131}$$

This result determines the polarizability of the charged ellipsoid, i.e.

$$\alpha_1 = 4\pi\varepsilon_m abc \frac{\varepsilon_{in} - \varepsilon_m}{3\varepsilon_m + 3L_1(\varepsilon_{in} - \varepsilon_m)} \tag{132}$$

Figure 17:
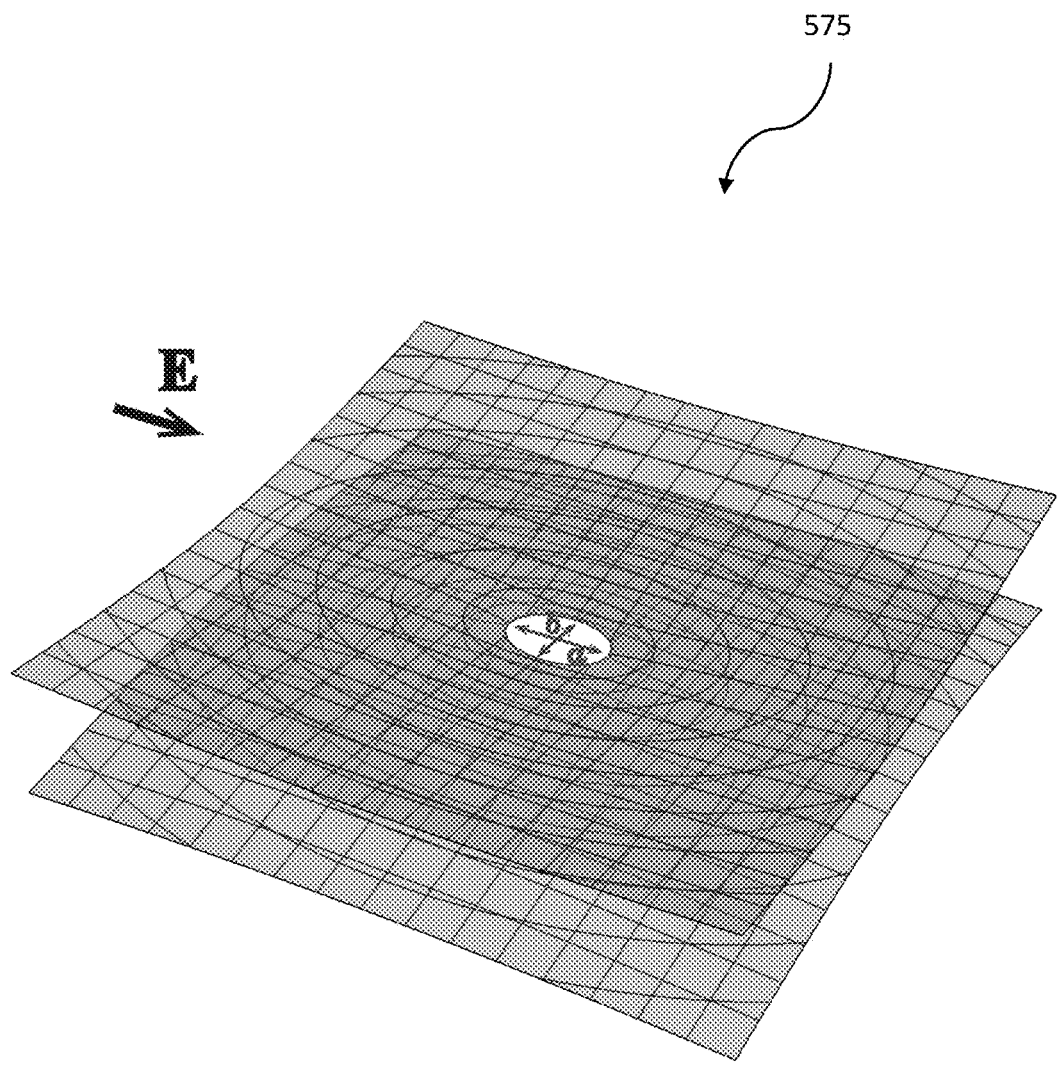
FIG. 17 is a diagram of a single-sheet hyperboloid with an elliptical wormhole, according to the present disclosure.

Let us consider a conducting single-sheet hyperboloid with a small elliptical wormhole, as shown in FIG. 16. Contrary to the case of an uncharged ellipsoid, where the solutions when applying the external electric field in x, y, or z direction are similar, the solutions in the case of an uncharged hyperboloid depend strongly on the axis in which the external field $E_0$ points. While the solutions for $E_0 = E_0 x$ and $E_0 = E_0 y$ are similar, the solution for $E_0 = E_0 z$ is completely different. The reason for this fundamental difference is that the ellipsoid resembles a sphere from far away. However, a single-sheet hyperboloid has elliptical cylindrical symmetry. FIG. 17 shows a schematic with a single-sheet hyperboloid with an elliptical wormhole of length a, width b, and depth c=0. The electric field $E_0$ points along the a axis of the ellipse.

Here, let us first calculate the electrostatic potential $\Phi(\xi, \eta, \zeta)$ of a conducting single-sheet hyperboloid with an elliptical hole, which can be represented by a limiting hyperboloid from a family of hyperboloids described by the implicit equation $$\frac{x^2}{a^2 + u} + \frac{y^2}{b^2 + u} + \frac{z^2}{c^2 + u} = 1 \tag{133}$$

for a>b>c. The cubic roots $\xi$, $\eta$, and $\zeta$ are all real in the ranges $$-a^2 \leq \zeta \leq -b^2, \; -b^2 \leq \eta \leq -c^2, \; -c^2 \leq \xi < \infty, \tag{134}$$

which are the ellipsoidal coordinates of a point (x,y,z). The limiting hyperboloid is a single planar sheet with an elliptical hole, i.e. it belongs to the family of solutions $\eta$ in the limit $\eta \to -c^2$. Therefore, let us choose this limiting case as our origin in ellipsoidal coordinates with c=0. Then Eq. (133) becomes $$\frac{x^2}{a^2 + u} + \frac{y^2}{b^2 + u} + \frac{z^2}{u} = 1 \tag{135}$$

for a>b>c=0. The cubic roots $\xi$, $\eta$, $\zeta$ are all real in the ranges $$-a^2 \leq \zeta \leq -b^2, \; -b^2 \leq \eta \leq 0, 0 \leq \xi, \tag{136}$$

The surface of the conducting hyperboloid is defined by $-b^2 \leq \eta = \eta_1 < 0$. Let us consider the case $E_0 = E_0 x$, which in the limit when the hyperboloid becomes a flat plane is the most relevant one. Therefore $$\Psi_0 = -E_0 x = \mp E_0 \sqrt{\frac{(\xi + a^2)(\eta + a^2)(\zeta + a^2)}{(b^2 - a^2)(-a^2)}} \tag{137}$$

in the lower-half plane, where the negative sign corresponds to positive x values and the positive sign to negative x values. Since the equipotential surfaces are determined by $\eta$, let $\Psi_p$ be the potential caused by the hyperboloid, with the boundary condition $\Psi_{in}(\eta=0)=0$. Requiring continuous boundary condition on the surface of the hyperboloid, we have $$\Psi_{in}(\xi, \eta_1, \zeta) = \Psi_0(\xi, \eta_1, \zeta) + \Psi_p(\xi, \eta_1, \zeta), \tag{138}$$

$$\varepsilon_{in} \frac{\partial \Psi_{in}}{\partial \eta}\bigg|_{\eta_1} = \varepsilon_m \frac{\partial \Psi_0}{\partial \eta}\bigg|_{\eta_1} + \varepsilon_m \frac{\partial \Psi_p}{\partial \eta}\bigg|_{\eta_1}, \tag{139}$$

where in the second equation the normal component of D at $\eta = \eta_1$ must be continuous. Then we make the ansatz for the electrostatic potential inside the hyperboloid, $$\Psi_{in}(\xi, \eta, \zeta) = -C_{in} E_0 x, \tag{140}$$

where $C_{in}$ is a constant. This ansatz satisfies the boundary condition $\Psi_{in}(\xi=0, \eta \to 0, \zeta)=0$. For the outside polarization field we choose $$\Psi_p(\xi, \eta, \zeta) = -C_p E_0 x F_1(\xi) K_1(\eta) \tag{141}$$

where $C_p$ is a constant, and we defined $$F_1(\xi) = \int_\xi^\infty \frac{a \, d\xi'}{2\xi'^{1/2}(\xi' + a^2)} - \int_\xi^\infty \frac{a \, d\xi'}{2(\xi' + a^2)^{3/2}} \tag{142}$$

$$= \arctan\left(\frac{a}{\sqrt{\xi}}\right) - \frac{a}{\sqrt{\xi + a^2}}.$$

Note that $$\lim_{\xi \to 0_-} \arctan\left(\frac{a}{\sqrt{\xi}}\right) = -\pi/2.$$

whereas $$\lim_{\xi \to 0_+} \arctan\left(\frac{a}{\sqrt{\xi}}\right) = \pi/2,$$

Therefore, in order to avoid discontinuity at $\xi=0$, we must have $$\arctan\left(\frac{a}{-\sqrt{\xi}}\right) = \pi - \arctan\left(\frac{a}{\sqrt{\xi}}\right).$$

$$K_1(\eta) = \int_\eta^\infty \frac{d\eta'}{(\eta' + a^2)R_{\eta'}}, \tag{143}$$

where $R_\eta = \sqrt{(\eta+a^2)(\eta+b^2)(-\eta)}$. The boundary conditions at $z \to +\infty$ are satisfied:

$$F_1(\xi) = \begin{cases} 0 & \text{for } z \to +\infty \\ \pi & \text{for } z \to -\infty \end{cases}. \tag{144}$$

At large distances $r = \sqrt{x^2+y^2+z^2}$ from the wormhole we have $\xi \approx r^2$. Then the far-field potential in the upper half-space, which is given by the pure polarization field, is $$\Psi_p(\xi, \eta, \zeta) \approx -C_p E_0 x K_1(\eta \approx -b^2) \frac{1}{3}\left(\frac{a}{\sqrt{\xi}}\right)^3 \tag{145}$$

$$\approx -C_p E_0 K_1(\eta \approx -b^2) \frac{a^3}{3} \frac{x}{r^3}$$

The polarization far-field has the form of a dipole field at large distances r from the wormhole. In order to determine the polarizability of the wormhole, let us find the solution at $\xi=0$, corresponding to the plane that passes through the center of the wormhole. For $\xi=0$, the unit vectors x and $\eta$ are parallel. In this near-field limit, the polarization potential has the form $$\Psi_p(\xi, \eta, \zeta) = -\tilde{C}_p E_0 x K_1(\eta), \tag{146}$$

where $\tilde{C}_p = C_p(\pi/2 - 1)$.

Using the boundary conditions shown in Eq. (139), we obtain the first equation $$\tilde{C}_p K_1(\eta_1) - C_{in} = 1, \tag{147}$$

and the second equation $$\varepsilon_m \tilde{C}_p \left[K_1(\eta_1)\frac{\partial x}{\partial \eta}\bigg|_{\eta_1} + K_{1'}(\eta_1) x|_{\eta_1}\right] - \varepsilon_{in} C_{in} \frac{\partial x}{\partial \eta}\bigg|_{\eta_1} = \varepsilon_m \frac{\partial x}{\partial \eta}\bigg|_{\eta_1}. \tag{148}$$

Using the derivatives $$\frac{\partial x}{\partial \eta}\bigg|_{\xi=0,\eta_1} = \frac{a}{2}\sqrt{\frac{(\zeta + a^2)}{(\eta_1 + a^2)(a^2 - b^2)(a^2 - c^2)}}, \tag{149}$$

$$K_{1'}(\eta_1) = \frac{1}{(\eta_1 + a^2)R_{\eta_1}} \tag{150}$$

we can rewrite the second equation as $$\varepsilon_m \tilde{C}_p \left[\frac{K_1(\eta_1)}{\eta_1 + a^2} + K_{1'}(\eta_1)\right] - \varepsilon_{in} C_{in} \frac{1}{\eta_1 + a^2} = \varepsilon_m \frac{1}{\eta_1 + a^2}, \tag{151}$$

which is equivalent to $$\varepsilon_m \tilde{C}_p \left[K_1(\eta_1) + \frac{1}{R_{\eta_1}}\right] - \varepsilon_{in} C_{in} = \varepsilon_m. \tag{152}$$

Thus, the potentials are $$\Psi_{in} = \frac{\Psi_0}{1 + \frac{L_1(\varepsilon_{in} - \varepsilon_m)}{\varepsilon_m}}, \tag{153}$$

$$\Psi_p = \Psi_0 \frac{R_{\eta_1} \frac{\varepsilon_m - \varepsilon_{in}}{\varepsilon_m} F_1(\xi) K_1(\eta)(\pi/2 - 1)}{1 + \frac{L_1(\varepsilon_{in} - \varepsilon_m)}{\varepsilon_m}}. \tag{154}$$

Then the far-field potential in the upper half-space, which is given by the pure polarization field, is $$\Psi_p \approx -E_0 \frac{R_{\eta_1} \frac{\varepsilon_m - \varepsilon_{in}}{\varepsilon_m} K_1(\eta \approx -b^2)(\pi/2 - 1)}{1 + \frac{L_1(\varepsilon_{in} - \varepsilon_m)}{\varepsilon_m}} \frac{a^3}{3} \frac{x}{r^3} \tag{155}$$

$$\approx -E_0 \frac{ab\sqrt{-\eta_1} \frac{\varepsilon_m - \varepsilon_{in}}{\varepsilon_m} \frac{2\pi}{a^3}(\pi/2 - 1)}{1 + \frac{L_1(\varepsilon_{in} - \varepsilon_m)}{\varepsilon_m}} \frac{a^3}{3} \frac{x}{r^3}$$

$$= -E_0 \frac{ab\sqrt{-\eta_1} \frac{\varepsilon_m - \varepsilon_{in}}{\varepsilon_m} \pi(\pi/2 - 1)}{1 + \frac{L_1(\varepsilon_{in} - \varepsilon_m)}{\varepsilon_m}} \frac{2x}{3r^3},$$

where we assumed that $a \approx b$. The polarization far-field has the form of a dipole field at large distances r from the wormhole. If the external electric field is applied in y-direction, we obtain the potentials $$\Psi_{in} = \frac{\Psi_0}{1 + \frac{L_2(\varepsilon_{in} - \varepsilon_m)}{\varepsilon_m}}, \tag{156}$$

$$\Psi_p = \Psi_0 \frac{R_{\eta_1} \frac{\varepsilon_m - \varepsilon_{in}}{\varepsilon_m} F_2(\xi) K_2(\eta)(\pi - 1)}{1 + \frac{L_2(\varepsilon_{in} - \varepsilon_m)}{\varepsilon_m}}, \tag{157}$$

with $$F_2(\xi) = \int_\xi^\infty \frac{b\, d\xi'}{2\xi'^{1/2}(\xi' + b^2)} - \int_\xi^\infty \frac{b\, d\xi'}{2(\xi' + b^2)^{3/2}}, \tag{158}$$

$$K_2(\eta) = \int_\eta^\infty \frac{d\eta'}{(\eta' + b^2)R_{\eta'}} \tag{159}$$

We defined the geometrical factors $$L_1 = R_{\eta_1} K_1(\eta_1) \approx ab\sqrt{-\eta_1} \int_{\eta_1}^{\infty} \frac{d\eta'}{(\eta' + a^2)R_{\eta'}}, \quad (160)$$

$$L_2 = R_{\eta_1} K_2(\eta_1) \approx ab\sqrt{-\eta_1} \int_{\eta_1}^{\infty} \frac{d\eta'}{(\eta' + b^2)R_{\eta'}}, \quad (161)$$

which are related to the depolarization factors by $$\tilde{L}_i = \frac{\varepsilon_{in} - \varepsilon_m}{\varepsilon_{in} - \varepsilon_0} \frac{L_i}{\varepsilon_m}. \quad (162)$$

This result determines the polarizability of the uncharged hyperboloid observable in the far-field, i.e.

$$\alpha_1 = \frac{2ab\sqrt{-\eta_1}\,\pi(\pi/2-1)}{3} \frac{\varepsilon_{in} - \varepsilon_m}{\varepsilon_m + L_1(\varepsilon_{in} - \varepsilon_m)} \quad (163)$$

Similarly, we obtain the polarizability in y-direction, i.e.

$$\alpha_2 = \frac{2ab\sqrt{-\eta_1}\,\pi(\pi/2-1)}{3} \frac{\varepsilon_{in} - \varepsilon_m}{\varepsilon_m + L_2(\varepsilon_{in} - \varepsilon_m)}. \quad (164)$$

Comparing to the polarizabilities of ellipsoids,[4] the polarizabilities of hyperboloids are proportional to $ab\sqrt{-\eta_1}$, which corresponds to the volume of the ellipsoid abc. In the case of circular wormholes, we have a=b, and therefore $\alpha_1 = \alpha_2 = \alpha_\parallel$, with $L_1 = L_2 = L_\mu$.

In our proposed mid-IR light source the effective combination of silicon nitride ($Si_3N_4$) and hexagonal boron nitride (h-BN) behaves as an environment with polar phonons. Both materials are polar with ions of different valence, which leads to the Frohlich interaction between electrons and optical phonons.[29] FIG. 17 shows that the interaction between the electrons in graphene and the polar substrate/graphene phonons modifies substantially the dispersion relations for the surface plasmon polaritons in graphene. The RPA dielectric function of graphene is given by[24, 22]

$$\varepsilon^{RPA}(q,\omega) = \varepsilon_m - v_c(q)\chi^0(q,\omega) - \varepsilon_m \sum_l v_{sph,l}(q,\omega)\chi^0(q,\omega) - \varepsilon_m v_{oph}(q,\omega)\chi^0_{j,j}(q,\omega). \quad (165)$$

The second term is due to the effective Coulomb interaction, and $v_c(q)=e^2 2q\epsilon 0$ is the 2D Coulomb interaction. The effective electron-electron interaction mediated by the substrate optical phonons, $$v_{sph,l}(q,\omega) = |M_{sph}|^2 G_l^0(\omega), \quad (166)$$

gives rise to the third term, where $|M_{sph}|^2$ is the scattering and $G_l^0$ is the free phonon Green function. The effective electron-electron interaction due to the optical phonons in graphene, $$v_{oph}(q,\omega) = |M_{oph}|^2 G^0(\omega), \quad (167)$$

gives rise to the last term of Eq. (165). $|M_{oph}|^2$ is the scattering matrix element, and $G^0(\omega)$ is the free phonon Green function. $X_{j,j}^0(q,\omega)$ is the current-current correlation function in Eq. (165).

Figure 18:
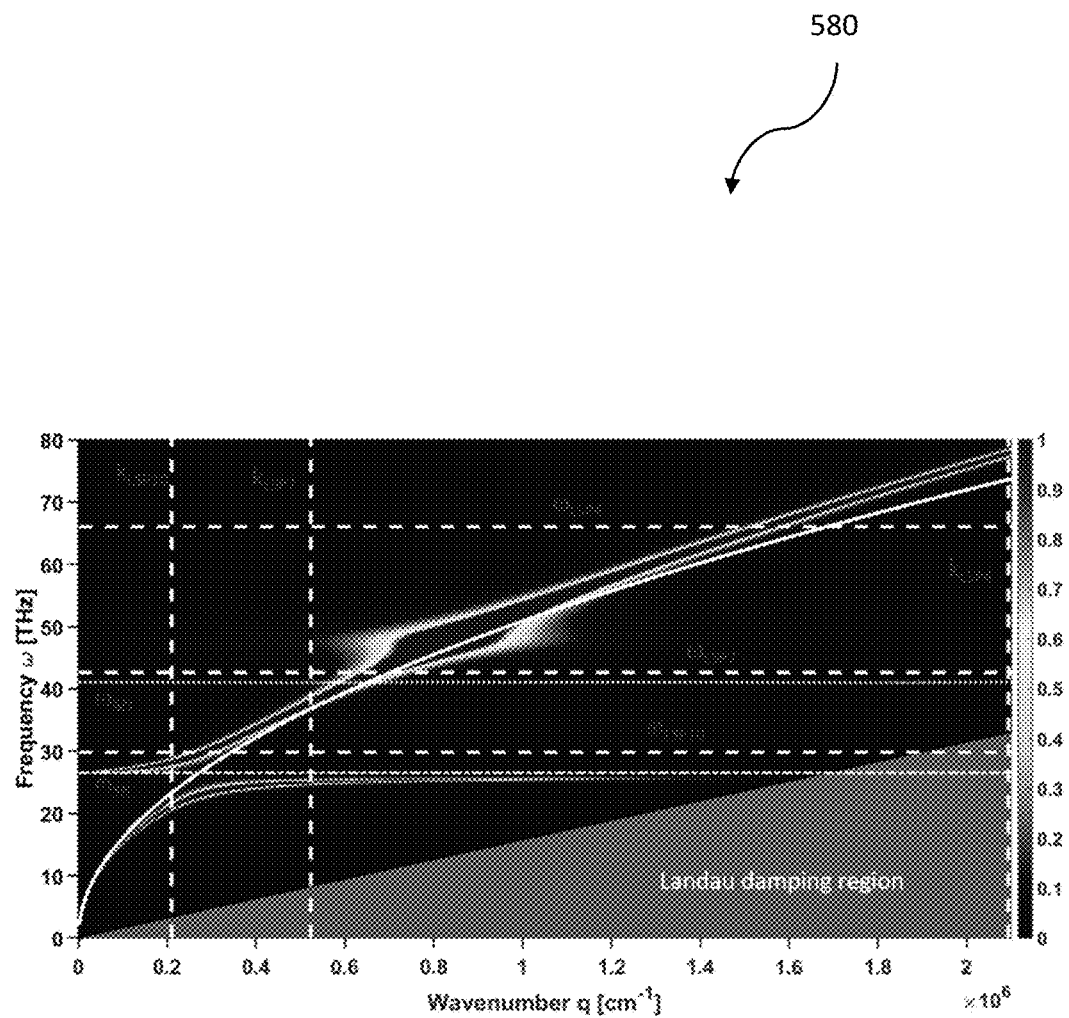
FIG. 18 is a diagram of energy loss function in the example embodiment of the IR source, according to the present disclosure.

FIG. 18 includes a diagram 580 showing the energy loss function for graphene with $\epsilon_F = -1.0$ eV. $k_{LSP4}$, $k_{LSP7}$, and $k_{LSP10}$ are the plasmon wavenumbers associated with the nanopatterning of the graphene sheet shown in FIGS. 5, 6, and 8, respectively. $\omega_{LSP4}$, $\omega_{LSP7}$, and $\omega_{LSP10}$ represent the LSP resonances shown in FIGS. 5, 6, and 8, respectively. The polar phonon resonance of h-BN and the surface polar phonon resonance of $Si_3N_4$ are denoted by $\omega_{BN}$ and $\omega_{SN}$, respectively. The Landau damping region is marked by the shaded area.

The relaxation time $\tau$ of the momentum consists of the electron-impurity, electron-phonon, and the electron-edge scattering, $\tau^{-1} = \tau_{DC}^{-1} + \tau_{edge}^{-1} + \tau_{e-p}^{-1}$, which determines the plasmon lifetime and the absorption spectrum bandwidth. It can be evaluated via the measured DC mobility μ of the graphene sample through $\tau_{DC} = \mu\hbar\sqrt{\pi\rho}/ev_F$, where $v_F=10^6$ m/s is the Fermi velocity, and the charge carrier density is given by $\tau_{DC} = \mu\hbar\sqrt{\mu\rho}/ev_F$. The edge scattering time is $\tau_{edge} \approx (1\times10^6 (m/s)/w-w_0)^{-1}$, where w is the edge-to-edge distance between the holes, and $w_0 = 7$ nm is the adjustment parameter. The electron-phonon scattering time is $\tau_{e-ph} = \hbar/2Im(\Sigma_{e-ph})$. The imaginary part of the electron-phonon self-energy reads $$Im(\Sigma_{e-ph}) = \gamma|\hbar\omega - sgn(\hbar\omega - E_F)\hbar\omega_{oph}| \quad (168)$$

where $\gamma = 18.3\times10^{-3}$ is the electron-phonon coupling coefficient. The optical phonon energy of graphene is given by $\hbar\omega_{oph} \approx 0.2$ eV.

The loss function Z describes the interaction of the SPPs and the substrate/graphene phonons. In RPA we have $$Z \propto -Im\left(\frac{1}{\varepsilon^{RPA}}\right). \quad (169)$$

In FIG. 17 (diagram 575), line a shows the loss function for graphene with carrier mobility it $\lambda = 3000$ cm²/V·s and a Fermi energy of $\epsilon_F = 1.0$ eV. In order to take advantage of the enhancement of the electromagnetic field at the position of the graphene sheet, the thickness of the optical cavity must be $\lambda/4n$, where n is the refractive index of the cavity material.[24] The LSP resonance frequencies $\omega_{LSP4}$, $\omega_{LSP7}$, and $\omega_{LSP10}$ mark the frequencies around the resonance wavelengths of 4 μm, 7 μm. and 10 μm. The resonance frequencies of the polar phonons are denoted by $\omega_{BN}$ for h-BN and by $\omega_{SN}$ for $Si_3N_4$.

For the calculation of the spectral radiance we need to integrate the elements of the dyadic Green function over the spherical angle. We can split the total dyadic Green function into a free space term $\overleftrightarrow{G}_0(r,r';\omega)$ and a term $\overleftrightarrow{G}_{SPP}(r,r';\omega)$ that creates surface plasmon polaritons inside graphene. Since the absorbance of the pristine graphene sheet is only 2.3%, we can safely neglect $\overleftrightarrow{G}_{SPP}(r,r';\omega)$. Our goal is to calculate the gray-body emission of the EM radiation from the LSP around the holes in graphene into free space. Therefore, we need to evaluate $$I_{GB}^{\infty}(\omega) = \lim_{r\to\infty} \int r^2 \sin\theta d\theta d\varphi I_{GB}(r,\omega), \quad (170)$$

where can use the approximation $$I_{GB}(r,\omega) = I_0(r,\omega) - I_{SPP}(r,\omega) \approx I_0(r,\omega). \quad (171)$$

In Cartesian coordinates, we can write down the dyadic Green function as[21]

$$\ddot{G}_0(r;\omega) = \frac{e^{ikr}}{4\pi r}\left[\left(1 + \frac{i}{kr} - \frac{1}{k^2r^2}\right)\vec{11} + \left(\frac{3}{k^2r^2} - \frac{3i}{kr} - 1\right)rr\right]. \quad (172)$$

Since we are interested only in the far field, we consider only the far-field component of the dyadic Green function, which is $$\ddot{G}_{FF}(r;\omega) = \frac{e^{ikr}}{4\pi r}[\vec{11} - rr], \quad (173)$$

which possesses only angular (transverse) components but no radial (longitudinal) components. Then the necessary components are $$G_{xx}(r;\omega) = \frac{e^{ikr}}{4\pi r}[1 - \sin^2\theta\cos^2\varphi], \quad (174)$$

$$G_{yx}(r;\omega) = \frac{e^{ikr}}{4\pi r}[1 - \sin^2\theta\cos\varphi\sin\varphi]$$

$$G_{zx}(r;\omega) = \frac{e^{ikr}}{4\pi r}[1 - \sin\theta\cos\theta\cos\varphi],$$

$$G_{xy}(r;\omega) = \frac{e^{ikr}}{4\pi r}[1 - \sin^2\theta\cos\varphi\sin\varphi],$$

$$G_{yy}(r;\omega) = \frac{e^{ikr}}{4\pi r}[1 - \sin^2\theta\sin^2\varphi],$$

$$G_{zy}(r;\omega) = \frac{e^{ikr}}{4\pi r}[1 - \sin\theta\cos\theta\sin\varphi],$$

The corresponding integrals are $$\int r^2\sin\theta d\theta d\varphi |G_{xx}(r;\omega)|^2 = \frac{2}{15\pi}, \quad (175)$$

$$\int r^2\sin\theta d\theta d\varphi |G_{yx}(r;\omega)|^2 = \frac{4}{15\pi},$$

$$\int r^2\sin\theta d\theta d\varphi |G_{zx}(r;\omega)|^2 = \frac{4}{15\pi},$$

$$\int r^2\sin\theta d\theta d\varphi |G_{xy}(r;\omega)|^2 = \frac{4}{15\pi},$$

$$\int r^2\sin\theta d\theta d\varphi |G_{yy}(r;\omega)|^2 = \frac{2}{15\pi},$$

$$\int r^2\sin\theta d\theta d\varphi |G_{zy}(r;\omega)|^2 = \frac{4}{15\pi}.$$

Regarding the doping of graphene due to $Si_3N_4$, the Silicon nitride, $Si_3N_4$, dielectric layer causes an effective n-type doping in graphene sheet [34,35]. The shift in Fermi energy is given by $$E_F = \hbar v_F\sqrt{\pi n}, \quad (176)$$

where vF is the Fermi velocity (vF≈$10^6$ m/s for graphene), is Planck's constant, and n is the carrier density. The carrier density n depends on the gate voltage and capacitance, i.e. where $V=(V_G-V_{CNP})$ is the gate voltage relative to charge neutrality point, e is electric charge, and C is the capacitance of dielectric layer, given by $C=\epsilon_r\epsilon_0/d$, $\epsilon_r$ is the relative permittivity, $\epsilon_0$ is the permittivity of free space, and d is the thickness of dielectric layer.

The gate capacitance for a 50 nm thick $Si_3N_4$ layer in the infrared region is $VG=4.5\times10^{-8}$F/cm$^2$. From Eq. (176) we conclude that the Fermi energy $E_F=1$ eV corresponds to a gate voltage relative to the CNP of $V=(V_G-V_{CNP})=6.9$ V. Wang et al. [36] observed that a $Si_3N_4$ film with a thickness of 50 nm shifts the CNP in a graphene sheet to −20 V, which shows that graphene is n-doped at zero gate voltage and the Fermi energy is $E_F=1.74$ eV. The Fermi energy can be tuned by applying a gate voltage to a desired value. In our work, we have used a Fermi energy of $E_F=1$ eV, which corresponds to V=6.59 V, i.e. for the CNP at −20 V, $V_G=-13.41$ V results in a Fermi energy of $E_F=1$ eV. From Eqs. (176) and (177), the carrier density required to achieve a Fermi energy of $E_F=1$ eV is n=1.94×1012 cm$^{-2}$, which corresponds to an electric field of $E_{1.0eV}=en/\epsilon_r\epsilon_0=1.38\times10^6$ Vcm$^{-1}$ which is in the safe zone compared to the reported breakdown field of the order of $10^7$ Vcm$^{-1}$ [38].

Figure 19A:
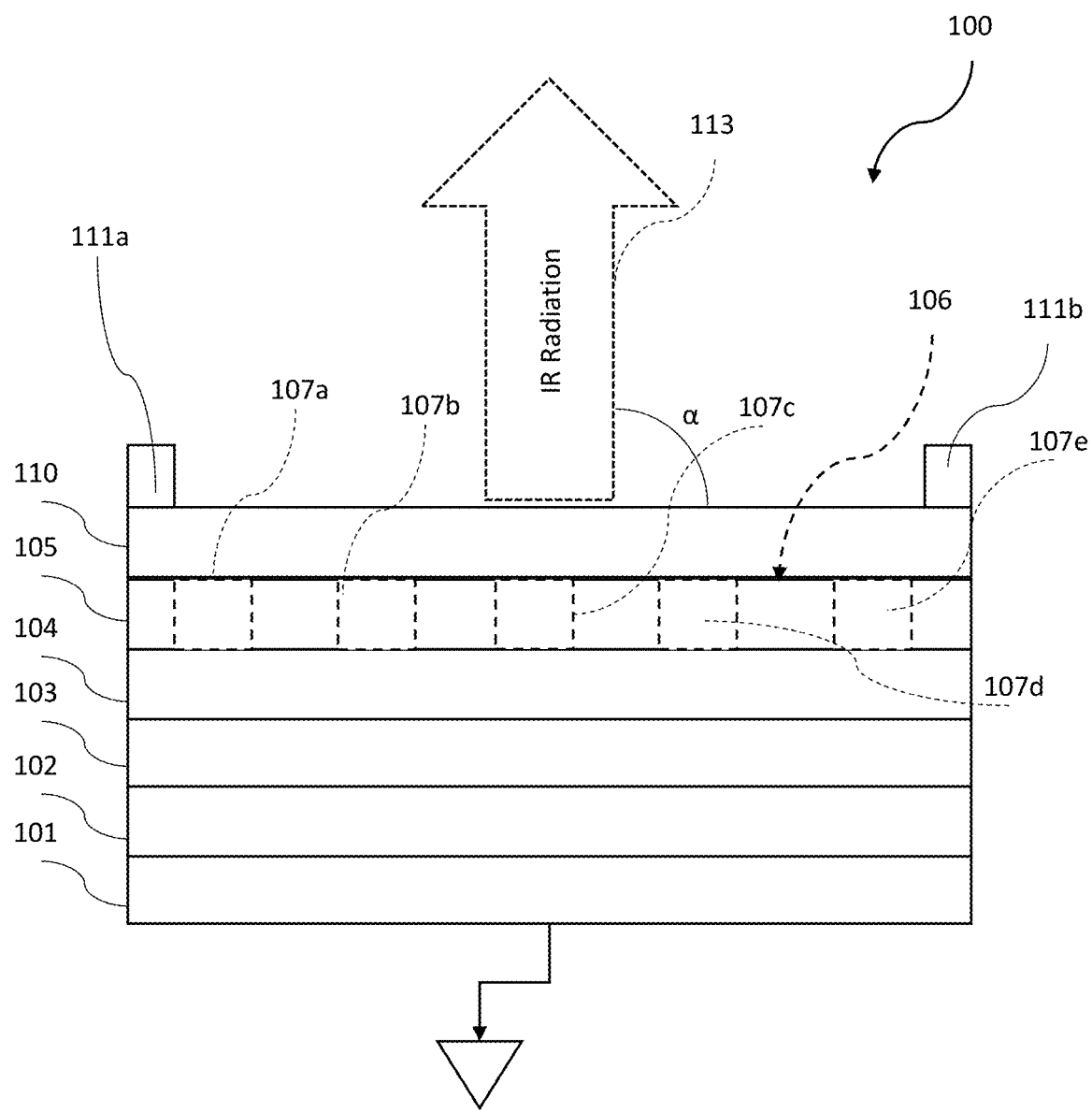
FIG. 19A is a schematic side view of an example embodiment of the IR source, according to the present disclosure.
Figure 19B:
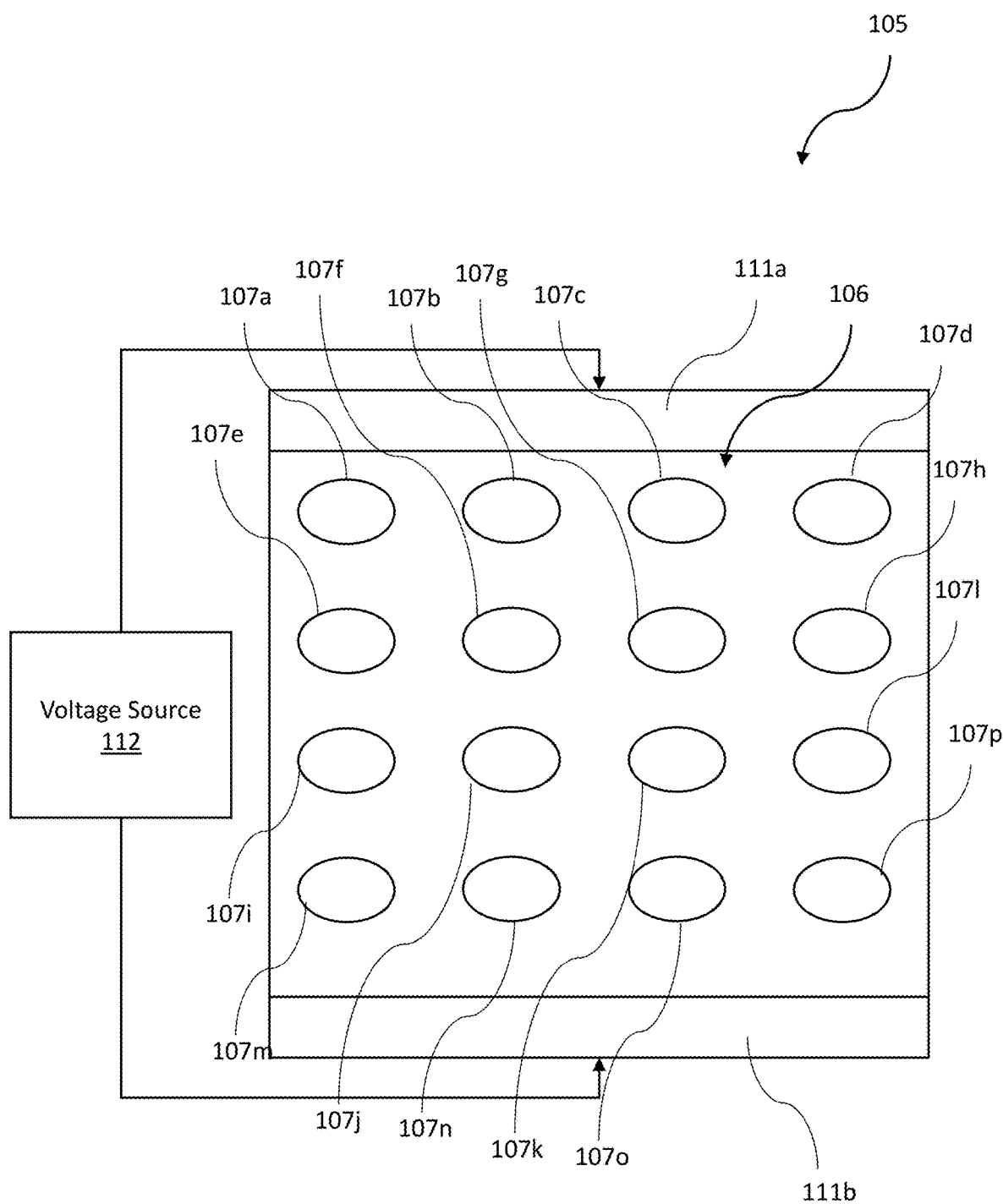
FIG. 19B is a schematic top plan view of the perforated pattern and the first and second electrically conductive contacts of the IR source of FIG. 19A.

Referring now additionally to FIGS. 19A-19B, an IR source 100 according to the present disclosure is now described. The IR source 100 illustratively includes an electrically conductive layer 101 defining a back contact. The electrically conductive layer 101 may comprise at least one of gold, silver, and platinum. The electrically conductive layer 101 is coupled to a reference voltage, for example, the illustrated ground potential.

The IR source 100 illustratively comprises a first dielectric layer 102 over the electrically conductive layer 101, a transparent electrically conductive layer 103 over the first dielectric layer, and a second dielectric layer 104 over the transparent electrically conductive layer. The first dielectric layer 102 may comprise a polymer dielectric material (e.g. SU-8 photoresist), but may comprise any dielectric material that is transparent to mid-IR. The first dielectric layer 102 defines a Fabry-Perot cavity, and must be transparent in the operational frequency of the IR source 100, for example, mid-IR. The transparent electrically conductive layer 103 may comprise indium tin oxide (ITO), or any conductive material transparent to mid-IR. Indeed, the transparent electrically conductive layer 103 must be transparent in the operational frequency of the IR source 100, for example, mid-IR. The second dielectric layer 104 may comprise an oxide layer, for example, silicon dioxide, or a silicon nitride material.

The IR source 100 illustratively includes a graphene layer 105 over the second dielectric layer 104 and having a perforated pattern 106. The perforated pattern 106 may comprise an array of circular-openings (See FIGS. 1-2). In the illustrated embodiment, the perforated pattern 106 comprises an array of elliptical holes 107a-107p. Also, the array is illustratively square-shaped, but can take on other shapes, such as a rectangle or a curved boundary shape.

The IR source 100 illustratively includes a protective layer 110 over the graphene layer 105, and first and second electrically conductive contacts 111a-111b coupled to the graphene layer. The protective layer 110 may comprise boron-nitride, for example, and protects the graphene layer 105 from oxidation.

The IR source 100 illustratively includes a voltage source 112 configured to apply a voltage signal is applied between the first and second electrically conductive contacts 111a-111b. The graphene layer 105 is configured to emit IR radiation 113 in a frequency range when the voltage signal is applied between the first and second electrically conductive contacts 111a-111b (e.g. copper, aluminum, silver, gold, or platinum). Also, the graphene layer 105 may be configured to emit the IR radiation 113 at an angle a from normal based upon varying the voltage signal. For example, the graphene layer 105 may be configured to emit mid-IR radiation. The graphene layer 105 may be configured to emit the IR radiation 113 at the angle within a range of 12°-80° from normal based upon the voltage signal. The graphene layer 105 may be configured to selectively change the frequency range based upon the voltage signal.

The graphene layer 105 is configured to emit IR radiation that is partially coherent (See FIG. 11). The graphene layer 105 is configured to emit the IR radiation 113 at a selective wavelength, which is based upon the size of the openings in the perforated pattern 106 in the graphene layer 105. The gate voltage may also be applied selectively to adjust the frequency of the IR radiation 113. In an example embodiment, the size of the IR source 100 may comprise 10 μm×10 μm.

Figure 20:
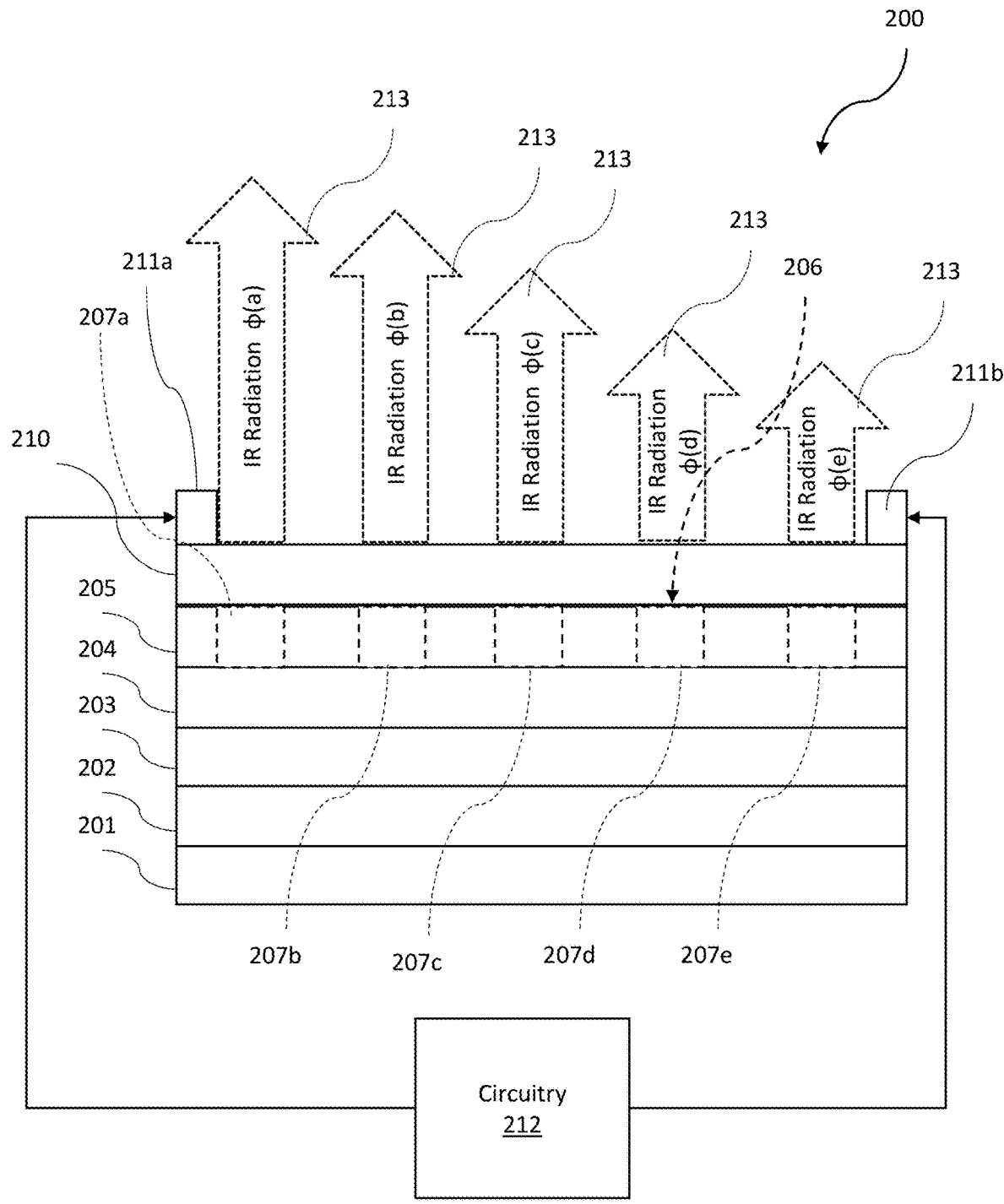
FIG. 20 is a schematic side view of an example embodiment of a phase antenna array, according to the present disclosure.

Referring now additionally to FIG. 20, another embodiment of the IR source 100 configured as a phased array 200 is now described. In this embodiment of the phased array 200, those elements already discussed above with respect to FIGS. 19A-19B are incremented by 100 and most require no further discussion herein. This embodiment differs from the previous embodiment in that this phased array 200 illustratively includes an electrically conductive layer 201, a first dielectric layer 202 over the electrically conductive layer, and a transparent electrically conductive layer 203 over the first dielectric layer. The phased array also comprises a second dielectric layer 204 over the transparent electrically conductive layer 203, and a graphene layer 205 over the second dielectric layer and having a perforated pattern 206 comprising an array of elliptical holes. The graphene layer 205 is configured to emit IR radiation in a frequency range.

The phased array also comprises first and second electrically conductive contacts 211a-211b coupled to the graphene layer 205, and circuity 212. The circuity 212 is configured to apply a voltage signal between the first and second electrically conductive contacts 211a-211b, change the voltage signal to selectively set phase change φ(a)-φ(e) between the IR radiation 213 emitted from adjacent elliptical holes 207a-207e to emit the IR radiation at an angle from normal, and change the voltage signal to selectively set the frequency range of the IR radiation.

Figure 21:
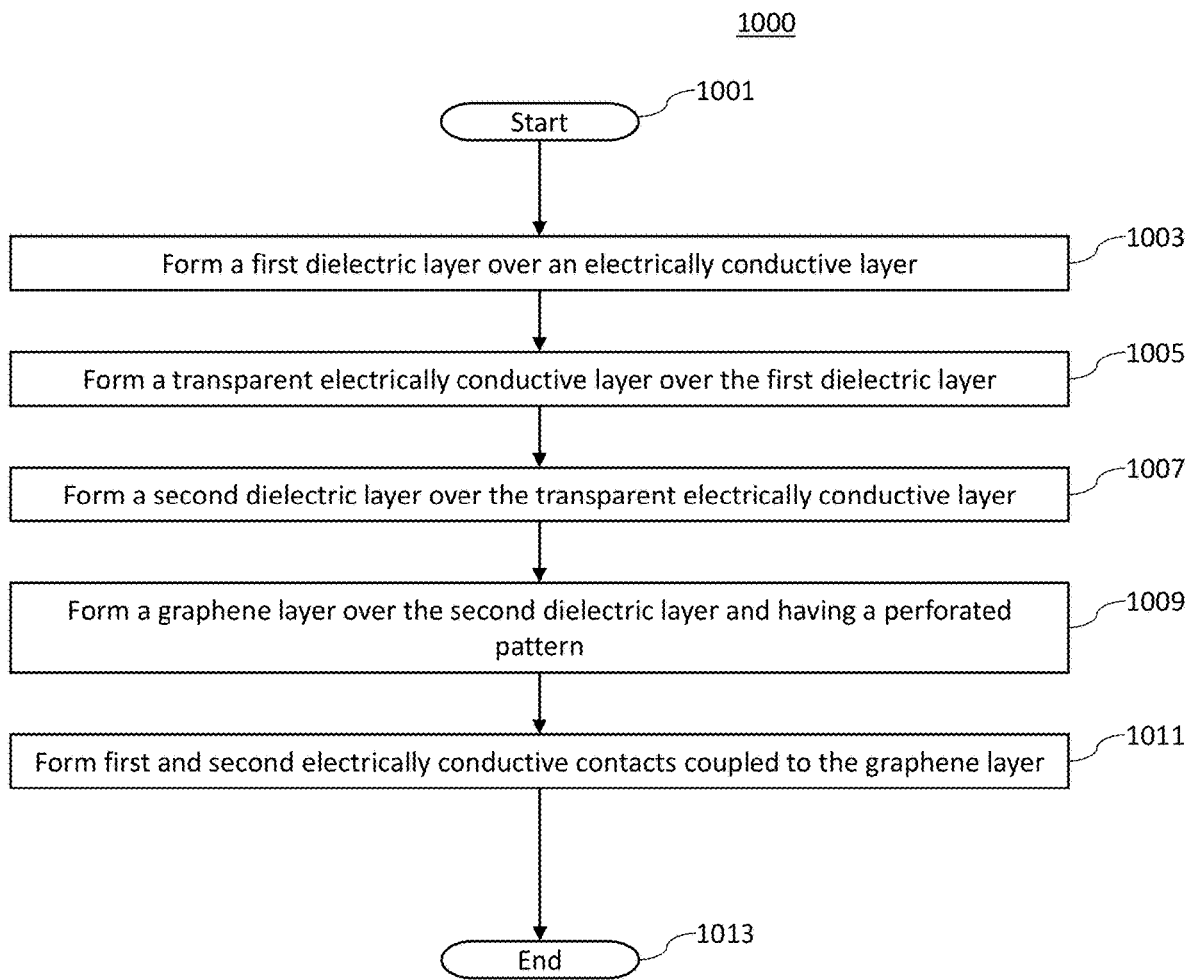
FIG. 21 is a flowchart of a method for making the IR source of FIG. 19A.

Referring now additionally to FIG. 21, a method for making an IR source 100 is now described with reference to a flowchart 1000, which begins at Block 1001. The method comprises forming a first dielectric layer 102 over an electrically conductive layer 101 (Block 1003), forming a transparent electrically conductive layer 103 over the first dielectric layer (Block 1005), and forming a second dielectric layer 104 over the transparent electrically conductive layer (Block 1007). The method comprises forming a graphene layer 105 over the second dielectric layer 104 and having a perforated pattern (Block 1009), forming a protective layer 110 over the graphene layer, and forming first and second electrically conductive contacts 111a-111b coupled to the graphene layer (Block 1011). The graphene layer 105 is configured to emit IR radiation in a frequency range when a voltage signal is applied between the first and second electrically conductive contacts 111a-111b. The method ends at Block 1013.

Figure 22:
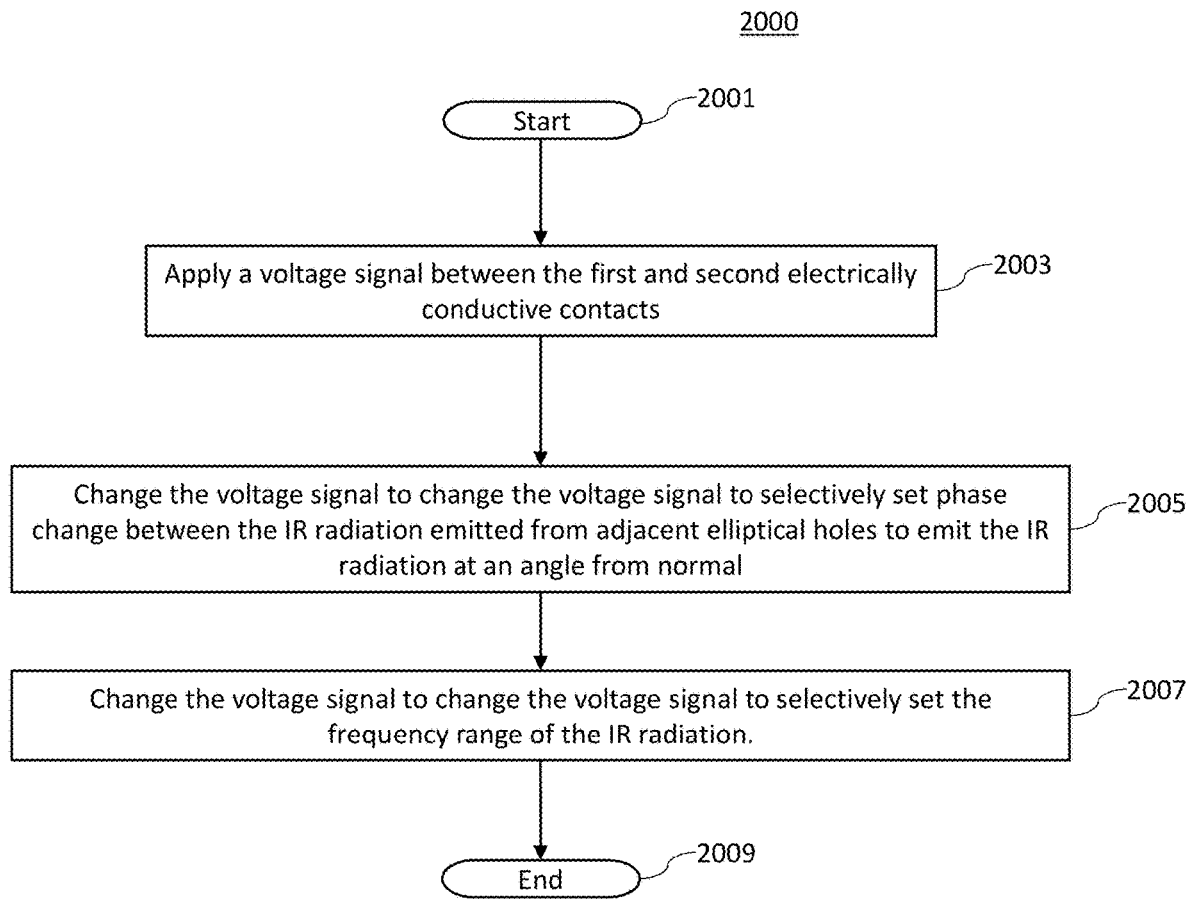
FIG. 22 is a flowchart of a method of operating the phased array of FIG. 20.

Referring now to FIGS. 20 and 22, a method for operating a phased array 200 is now described with reference to a flowchart 2000, which begins at Block 2001. The phased array comprises 200 an electrically conductive layer 201, a first dielectric layer 202 over the electrically conductive layer, a transparent electrically conductive layer 203 over the first dielectric layer, a second dielectric layer 204 over the transparent electrically conductive layer, a graphene layer 205 over the second dielectric layer and having a perforated pattern 206 comprising an array of elliptical holes 207a-207e, the graphene layer configured to emit IR radiation 213 in a frequency range, and first and second electrically conductive contacts 2111-2111b coupled to the graphene layer. The method includes operating circuity 212 coupled between the first and second electrically conductive contacts 211a-211b to apply a voltage signal between the first and second electrically conductive contacts (Block 2003), change the voltage signal to selectively set phase change between the IR radiation 213 emitted from adjacent elliptical holes 207a-207e to emit the IR radiation at an angle from normal (Block 2005), and change the voltage signal to selectively set the frequency range of the IR radiation (Block 2007). The method ends at Block 2009.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

References (Incorporated by Reference in their Entirety)

[1] Milton Abramowitz and Irene A. Stegun. Handbook of Mathematical Functions: with Formulas, Graphes, and Mathematical Tables. Dover, 1965.

[2] Bandurin, D. A. et al. Negative local resistance caused by viscous electron backflow in graphene. Science 351, 1055-1058 (2016).

[3] Baranov, Denis G. et al. Nanophotonic engineering of far-field thermal emitters. Nat. Mater. 18, 920-930 (2019).

[4] Bohren, C. F. & Huffman, D. R. Absorption and scattering of light by small particles (Wiley, Amsterdam, 1998).

[5] Remi Carminati and Jean-Jacques Greffet. Near-field effects in spatial coherence of thermal sources. Phys. Rev. Lett., 82:1660-1663, February 1999.

[6] Celanovic, Ivan, Perreault, David & Kassakian, John. Resonant-cavity enhanced thermal emission. Phys. Rev. B 72, 075127 (2005).

[7] Christensen, Thomas. From Classical to Quantum Plasmonics in Three and Two Dimensions (Springer, Berlin, 2017).

[8] Cornelius, Christopher M. & Dowling, Jonathan P. Modification of planck blackbody radiation by photonic band-gap structures. Phys. Rev. A 59, 4736-4746 (1999).

[9] Freitag, M., Chiu, H. Y., Steiner, M., Perebeinos, V. & Avouris, P. Thermal infrared emission from biased graphene. Nat. Nanotechnol. 5, 497 (2010).

[10] Greffet, Jean-Jacques. et al. Coherent emission of light by thermal sources. Nature 416, 61-64 (2002).

[11] Greffet, Jean-Jacques. Revisiting thermal radiation in the near field. C.R. Phys. 18, 24-30 (2017).

[12] Carminati, Remi. & Greffet, Jean-Jacques. Near-field effects in spatial coherence of thermal sources. Phys. Rev. Lett. 82, 1660-1663 (1999).

[13] Henkel, C. & Joulain, K. Electromagnetic field correlations near a surface with a nonlocal optical response. Appl. Phys. B 84, 61-68 (2006).

[14] Kim, Y. D. et al. Ultrafast graphene light emitters. Nano Lett. 18, 934-940 (2018).

[15] Landau, L. D., Lifshitz, E. M. & Pitaevskii, L. P. Electrodynamics of Continuous Media 2nd edn. (Elsevier, Amsterdam, 1984).

[16] Lifshitz, Evgeny & Pitaevskii, P. Statistical Physics: Part 2 3rd edn. (Elsevier, Amsterdam, 1980).

[17] Lin, Shawn-Yu. et al. Enhancement and suppression of thermal emission by a three-dimensional photonic crystal. Phys. Rev. B 62, R2243-R2246 (2000).

[18] Li, Le-Wei., Kang, Xiao-Kang. & Leong, Mook-Seng. Spheroidal Wave Functions in Electromagnetic Theory (Wiley, Hoboken, 2002).

[19] Yang, Zih-Ying. et al. Narrowband wavelength selective thermal emitters by confined tamm plasmon polaritons. ACS Photonics 4, 2212-2219 (2017).

[20] Luxmoore, I. J. et al. Thermal emission from large area chemical vapor deposited graphene devices. Appl. Phys. Lett. 103, 131906 (2013).

[21] Novotny, Lukas & Hecht, Bert. Principles of Nano-Optics (Cambridge University Press, Cambridge, 2012).

[22] Paudel, Hari P., Safaei, Alireza & Michael, N. Leuenberger, nanoplasmonics in metallic nanostructures and dirac systems. In Nanoplasmonics - Fundamentals and Applications 3rd edn (ed. Gregory, B.) 1142 (Intech, London, 2017).

[23] Roy, Supti, Perez-Guaita, David, Bowden, Scott, Heraud, Philip & Wood, Bayden R. Spectroscopy goes viral: Diagnosis of hepatitis b and c virus infection from human sera using atr-ftir spectroscopy. Clin. Spectrosc. 1, 100001 (2019).

[24] Safaei, Alireza et al. Dynamically tunable extraordinary light absorption in monolayer graphene. Phys. Rev. B 96, 165431 (2017).

[25] A. Safaei, S. Chandra, M. W. Shabbir, M. N. Leuenberger, and D. Chanda. Dirac plasmon-assisted asymmetric hot carrier generation for room-temperature infrared detection. Nature Communications, 10:3498, 2019.

[26] Shiue, R. J. et al. Thermal radiation control from hot graphene electrons coupled to a photonic crystal nanocavity. Nat. Commun. 10, 109 (2019).

[27] Thongrattanasiri, S., Koppens, F. H. L. & de Abajo, F. J. G. Complete optical absorption in periodically patterned graphene. Phys. Rev. Lett. 108, 047401 (2012).

[28] Zih-Ying Yang, Satoshi Ishii, Takahiro Yokoyama, Thang Duy Dao, Mao-Guo Sun, Pavel S. Pankin, Ivan V. Timofeev, Tadaaki Nagao, and Kuo-Ping Chen. Narrowband wavelength selective thermal emitters by confined tamm plasmon polaritons. ACS Photonics, 4(9):2212-2219, 2017.

[29] Yan, Hugen et al. Damping pathways of mid-infrared plasmons in graphene nanostructures. Nat. Photonics 7, 394-399 (2013).

[30] Luo, Fang et al. Graphene thermal emitter with enhanced joule heating and localized light emission in air. ACS Photonics 6, 2117-2125 (2019).

[31] Zhao, L. L., Kelly, K. L. & Schatz, G. C. The extinction spectra of silver nanoparticle arrays: influence of array structure on plasmon resonance wavelength and width. J. Phys. Chem. B 107, 7343-7350 (2003).

[32] Zhang, Yuping et al. Independently tunable dual-band perfect absorber based on graphene at mid-infrared frequencies, Sci. Rep. 5, 18463 (2015).

[33] Lin, Keng-Te., Lin, Han, Yang, Tieshan & Jia, Baohua. Structured graphene metamaterial selective absorbers for high efficiency and omnidirectional solar thermal energy conversion. Nat. Commun. 11, 1389 (2020).

[34] Henkel, C., Joulain, K., Carminati, R. & Greffet, J.-J. Spatial coherence of thermal near fields. Opt. Commun. 186, 57-67 (2000).

[35] Safaei, A., Chandra, S., Leuenberger, M. N. & Chanda, D. Wide angle dynamically tunable enhanced infrared absorption on largearea nanopatterned graphene. ACS Nano 13, 421-428 (2019).

[36] Wang, Zegao et al. Air-stable n-type doping of graphene from overlying si3n4 film. Appl. Surf. Sci. 307, 712-715 (2014).

[37] Wittmann, Sebastian et al. Dielectric surface charge engineering for electrostatic doping of graphene. ACS Appl. Electr. Mat. 2, 1235-1242 (2020).

[38] Zhu, Wenjuan, Neumayer, Deborah, Perebeinos, Vasili & Avouris, Phaedon. Silicon nitride gate dielectrics and band gap engineering in graphene layers. Nano Lett. 10, 3572-3576 (2010).

The invention claimed is:

1. A method of operating a phased array comprising an electrically conductive layer, a first dielectric layer over the electrically conductive layer, a transparent electrically conductive layer over the first dielectric layer, a second dielectric layer over the transparent electrically conductive layer, a graphene layer over the second dielectric layer and having a perforated pattern comprising an array of elliptical holes, the graphene layer configured to emit infrared (IR) radiation in a frequency range, and first and second electrically conductive contacts coupled to the graphene layer, the method comprising:

operating circuity coupled between the first and second electrically conductive contacts to
  apply a voltage signal between the first and second electrically conductive contacts,
  change the voltage signal to selectively set phase change between the IR radiation emitted from adjacent elliptical holes to emit the IR radiation at an angle from normal, and
  change the voltage signal to selectively set the frequency range of the IR radiation.

2. The method of claim 1 further comprising operating the array of elliptical holes as phased nanoantennas.

3. The method of claim 1 further comprising operating circuity to cause adjacent elliptical holes to emit the IR radiation at different phases.

4. The method of claim 1 further comprising operating circuity to cause the graphene layer to emit the IR radiation at the angle from normal based upon the voltage signal.

5. The method of claim 4 further comprising operating circuity to cause the graphene layer to emit the IR radiation at the angle within a range of 12°-80° from normal based upon the voltage signal.

6. The method of claim 1 operating circuity to cause the graphene layer to selectively change the frequency range based upon the voltage signal.

7. The method of claim 1 further comprising operating circuity to cause the graphene layer to emit mid-IR radiation.

8. The method of claim 1 further comprising coupling a reference voltage to the electrically conductive layer.

9. The method of claim 1 further comprising operating circuity to cause the graphene layer to emit the IR radiation at a frequency greater than 10 Thz.

10. The method of claim 1 wherein the electrically conductive layer comprise at least one of gold, silver, and platinum; wherein the first dielectric layer comprises a polymer layer; and wherein the second dielectric layer comprises an oxide layer.

11. A method of operating a phased array comprising an electrically conductive layer, a first dielectric layer over the electrically conductive layer, a transparent electrically conductive layer over the first dielectric layer, a second dielectric layer over the transparent electrically conductive layer, a graphene layer over the second dielectric layer and having a perforated pattern comprising an array of elliptical holes, the graphene layer configured to emit infrared (IR) radiation in a frequency range, and first and second electrically conductive contacts coupled to the graphene layer, the method comprising:

applying a voltage signal between the first and second electrically conductive contacts;

changing the voltage signal to selectively set phase change between the IR radiation emitted from adjacent elliptical holes to emit the IR radiation at an angle from normal; and changing the voltage signal to selectively set the frequency range of the IR radiation.

12. The method of claim 11 further comprising operating the array of elliptical holes as phased nanoantennas.

13. The method of claim 11 further comprising operating circuity to cause adjacent elliptical holes to emit the IR radiation at different phases.

14. The method of claim 11 further comprising operating circuity to cause the graphene layer to emit the IR radiation at the angle from normal based upon the voltage signal.

15. The method of claim 14 further comprising operating circuity to cause the graphene layer to emit the IR radiation at the angle within a range of 12°-80° from normal based upon the voltage signal.

16. The method of claim 11 operating circuity to cause the graphene layer to selectively change the frequency range based upon the voltage signal.

17. The method of claim 11 further comprising operating circuity to cause the graphene layer to emit mid-IR radiation.

18. The method of claim 11 further comprising coupling a reference voltage to the electrically conductive layer.

19. The method of claim 11 further comprising operating circuity to cause the graphene layer to emit the IR radiation at a frequency greater than 10 Thz.

20. The method of claim 11 wherein the electrically conductive layer comprise at least one of gold, silver, and platinum; wherein the first dielectric layer comprises a polymer layer; and wherein the second dielectric layer comprises an oxide layer.

* * * * *